(12) United States Patent
Oshidari et al.

(10) Patent No.: US 7,207,915 B2
(45) Date of Patent: Apr. 24, 2007

(54) HYBRID TRANSMISSION

(75) Inventors: Toshikazu Oshidari, Kanagawa (JP); Keyvan Kargar, Versailles (FR); Joël Poupon, Paris (FR); Yuuji Gotoh, Yokohama (JP); Yasuhiro Yamauchi, Kanagawa (JP); Kazuo Yatabe, Kanagawa (JP)

(73) Assignees: Nissan Motor Co., Ltd., Yokohama-shi (JP); Renault s.a.s. societe par actions simplifiee, Boulogne-Billancourt (FR)

( * ) Notice: Subject to any disclaimer, the term of this patent is extended or adjusted under 35 U.S.C. 154(b) by 17 days.

(21) Appl. No.: 10/654,620

(22) Filed: Sep. 4, 2003

(65) Prior Publication Data

US 2004/0077448 A1 Apr. 22, 2004

(30) Foreign Application Priority Data

Sep. 4, 2002 (JP) ............................. 2002-258879
Jul. 16, 2003 (JP) ............................. 2003-197848

(51) Int. Cl.
*F16H 3/72* (2006.01)

(52) U.S. Cl. ........................................................ 475/5
(58) Field of Classification Search .................... 475/1, 475/2, 5
See application file for complete search history.

(56) References Cited

U.S. PATENT DOCUMENTS 5,558,589 A 9/1996 Schmidt
5,931,757 A 8/1999 Schmidt
6,022,287 A * 2/2000 Klemen et al. ................ 475/5
6,579,201 B2 * 6/2003 Bowen .......................... 475/5
6,732,526 B2 * 5/2004 Minagawa et al. ........... 60/706
6,910,981 B2 * 6/2005 Minagawa et al. ............ 475/5
2003/0073534 A1 * 4/2003 Oshidari et al. ............... 475/5

FOREIGN PATENT DOCUMENTS

DE 196 06 771 A1 8/1997

(Continued)

OTHER PUBLICATIONS

U.S. Appl. No. 10/361,611, filed Feb. 11, 2003, Minagawa et al.

(Continued)

*Primary Examiner*—Ha Ho
(74) *Attorney, Agent, or Firm*—Foley & Lardner LLP

(57) ABSTRACT

In a hybrid transmission, input and output side motor/generators (MG1, MG2) and input and output portions (In, Out) are coupled to two sets of the differential units (G1, G2) in such a manner that, under a selection of a first predetermined gear ratio, in a revolution speed order, the input side motor/generator (MG1), the input portion (In) from a prime mover (engine), the output portion (Out) toward a vehicular drive system, and the output side motor/generator (MG2) are coupled to the respective revolvable elements of the two sets of the differential units (G1, G2) and the output side motor/generator is coupled to any one of the revolvable elements of the two sets of the differential units including those revolvable elements thereof which do not contribute to a revolution of the output portion.

24 Claims, 29 Drawing Sheets

FOREIGN PATENT DOCUMENTS

| | | |
|---|---|---|
| DE | 197 39 906 A1 | 3/1999 |
| DE | 199 09 424 A1 | 8/2000 |
| GB | 1 308 003 | 2/1973 |
| JP | 61-6447 * 1/1986 | .................... 475/1 |
| JP | 11-301291 A | 11/1999 |
| JP | 2000-062483 A | 2/2000 |

OTHER PUBLICATIONS

U.S. Appl. No. 10/375,026, filed Feb. 28, 2003, Minagawa et al.

U.S. Appl. No. 10/445,907, filed May 28, 2003, Yamauchi et al.

U.S. Appl. No. 10/445,846, filed May 28, 2003, Yamauchi et al.

* cited by examiner

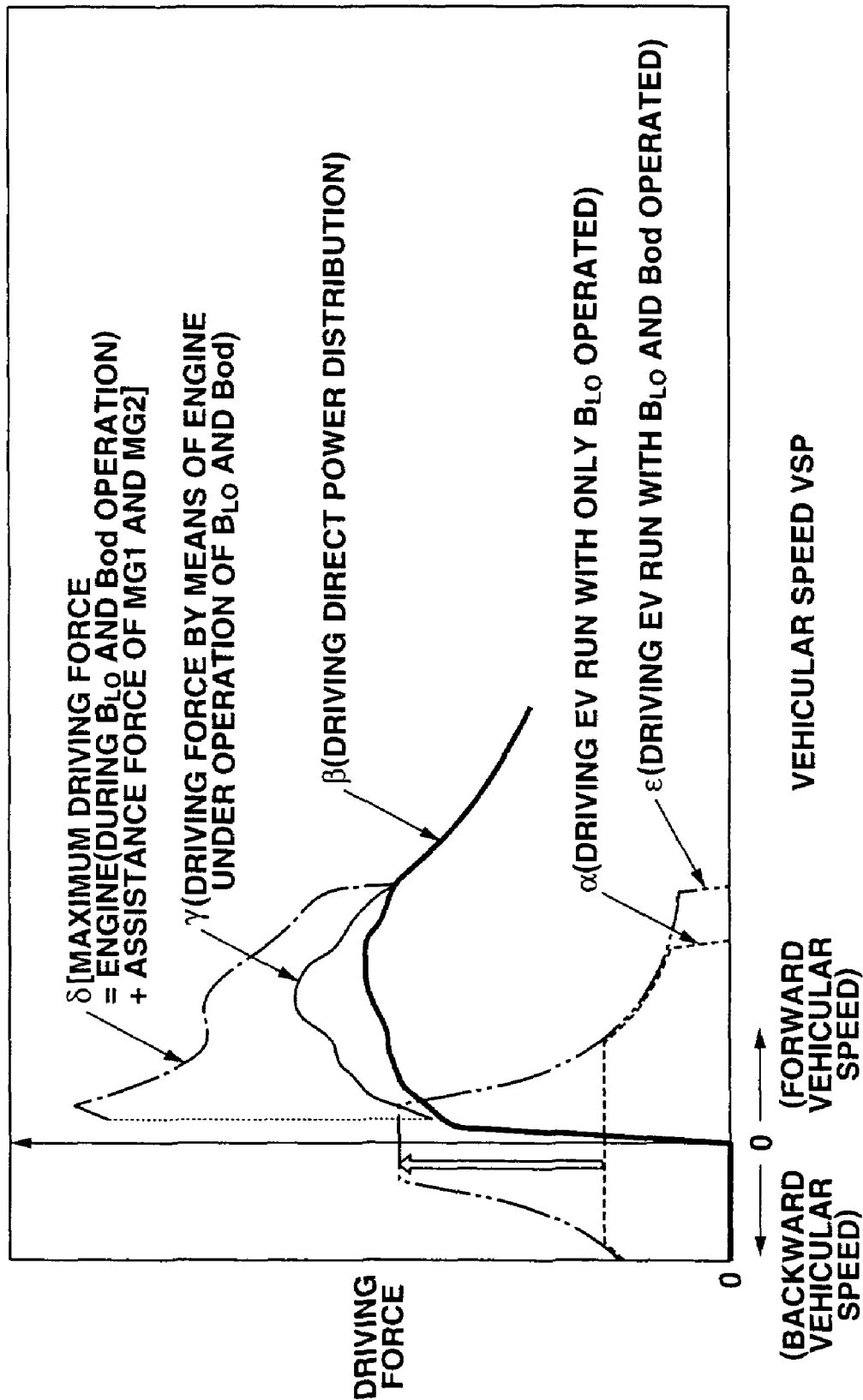

HYBRID TRANSMISSION

BACKGROUND OF THE INVENTION

1. Field of the Invention

The present invention relates generally to a hybrid transmission suitable for a hybrid vehicle in which a prime mover such as an engine and at least one motor/generator (a motor functions as a generator or vice versa) are mounted. The present invention relates particularly to a gear shift control apparatus for the hybrid transmission which is capable of making a differential unit which couples between the prime mover (engine) and motor/generator(s) carry out a continuously variably transmitting operation using at least two differential units coupling between the prime mover and the motor/generator.

2. Description of the Related Art

A hybrid transmission is generally of a series-connection type, a parallel-connection type, and a combination type of series-and-parallel-connection. In any type of the hybrid transmissions, a whole or part of engine revolution energy is, once, converted into an electrical energy by means of a generator. It is general practice that powers of this electrical energy and from a power battery cause a motor coupled to a vehicular drive system to be driven to run the vehicle and an extra electrical energy is charged into the battery. An engine operating point is defined to achieve an optimum fuel economy. A charge and a discharge to and from the battery are carried out at a favorable timing so that a driving force in accordance with a driving condition can be developed under a favorable fuel consumption. A general hybrid transmission has a large passing power of the motor/generator in a low side transmission gear (or shift) ratio region including a reverse gear (or shift) ratio. The large passing power requires a large sized (large capacity) motor/generator and a width of the gear (shift) ratio which is capable of transmitting an engine power becomes narrower.

A Japanese Patent Application First Publication No. 2000-62483 published on Feb. 29, 2000 (which corresponds to a U.S. Pat. No. 5,931,757 issued on Aug. 3, 1999) exemplifies a previously proposed hybrid transmission (two-mode compound-split electro-mechanical vehicular transmission). In the above-described Japanese Patent Application First Publication, the gear (shift) region is divided into two regions, viz., a low side gear (or shift) ratio region including a reverse (reverse run) gear ratio and a high-side gear ratio region. An alternative between a clutch and a brake causes a switch between gear shift (gear ratio) modes. Even in the low-side gear ratio region including the backward (reverse) gear ratio, the alternative type hybrid transmission which has aimed at preventing the passing power through motor/generator from becoming large has been proposed.

SUMMARY OF THE INVENTION

However, since, in the above-described alternative type hybrid transmission, the clutch and the brake, both for the gear (or shift) mode switching purpose, are switched between operations and non-operations on an output axle portion of the transmission, a large torque needs to be received at these clutches and brakes. Thus, large capacity clutch and brake are accordingly needed. This involves a large size of the hybrid transmission. Especially, since, in the gear (or shift) mode in the low-side gear ratio region including the reverse gear ratio, the motor/generator is directly coupled to the road wheels. Hence, the passing power of the motor/generator with respect to an input power to the transmission becomes large. During the selection of the gear ratio (shift) mode, such an original aim as described above, viz., preventing the large passing power of the motor/generator from being enlarged is not achieved. Even if the hybrid transmission is improved to be gear (shift) mode alternative hybrid transmission, a miniaturization of the motor/generator cannot consequently be realized. In addition, a width of gear (shift) ratio at which the engine power can be transmitted cannot be narrowed any more.

It is, hence, an object of the present invention to provide a hybrid transmission in which the motor/generator(s) are not directly coupled to road wheels even in the low-side transmission gear ratio (shift ratio) region including the reverse gear ratio and the passing power to the motor/generator in the low-side transmission gear ratio region is not augmented and, hence, the miniaturization of motor/generator can be realized and the width of the gear (shift) ratio at which the engine power can be transmitted can be widened.

According to one aspect of the present invention, there is provided a hybrid transmission, comprising: a gear train that constitutes two sets of differential units, each differential unit having two degrees of freedom and three revolvable elements, and that enables a selection between a first redetermined gear ratio at which, with one revolvable element of one of the two sets of the differential units coupled to one revolvable element of the other of the two sets of the differential units, the remaining one revolvable element of the one thereof is revolved with the remaining one revolvable element of the other thereof mutually in the same direction and a second predetermined gear ratio at which, with the one revolvable element thereof coupled to the one revolvable element, the remaining one of the one thereof is revolved with the remaining one of the other thereof mutually in reverse directions; an input side motor/generator; an output side motor/generator; an input portion from a prime mover; and an output portion toward a drive system, the input and output side motor/generators and the input and output portions being coupled to the two sets of the differential units in such a manner that, under the selection of the first predetermined gear ratio, in a revolution speed order, the input side motor/generator, the input portion from the prime mover, the output portion toward the drive system, and the output side motor/generator are coupled to the respective revolvable elements of the two sets of the differential units and the output side motor/generator is coupled to any one of the revolvable elements of the two sets of the differential units excluding those revolvable elements thereof which contribute to a revolution of the output portion.

According to another aspect of the present invention, there is provided a method applicable to a hybrid transmission, comprising: providing a gear train that constitutes two sets of differential units, each differential unit having two degrees of freedom and three revolvable elements, and that enables a selection between a first predetermined gear ratio at which, with one revolvable element of one of the two sets of the differential units coupled to one revolvable element of the other of the two sets of the differential units, the remaining one revolvable element of the one thereof is revolved with the remaining one revolvable element of the other thereof mutually in the same direction and a second predetermined gear ratio at which, with the one revolvable element thereof coupled to the one revolvable element, the remaining one of the one thereof is revolved with the remaining one of the other thereof mutually in reverse directions; providing an input side motor/generator; providing an output side motor/generator; providing an input portion from a prime mover; providing an output portion toward a drive system; and coupling the input and output side motor/generators and input and output portions to the two sets of the differential units in such a manner that, under the selection of the first predetermined gear ratio, in a revolution speed order, the input side motor/generator, the input portion from the prime mover, the output portion toward the drive system, and the output side motor/generator are coupled to the respective revolvable elements of the two sets of the differential units and the output side motor/generator is coupled to any one of the revolvable elements of the two sets of the differential units excluding those revolvable elements thereof which contribute to a revolution of the output portion.

This summary of the invention does not necessarily describe all necessary features so that the invention may also be a sub-combination of these described features.

BRIEF DESCRIPTION OF THE DRAWINGS

FIG. 29 is a characteristic graph representing a relationship between a vehicular velocity VSP and driving force when the start control shown in FIG. 28B is executed by the transmission controller shown in FIG. 28A.

DETAILED DESCRIPTION OF THE PREFERRED EMBODIMENTS

Reference will hereinafter be made to the drawings in order to facilitate a better understanding of the present invention.

(First Embodiment)

Figure 1:
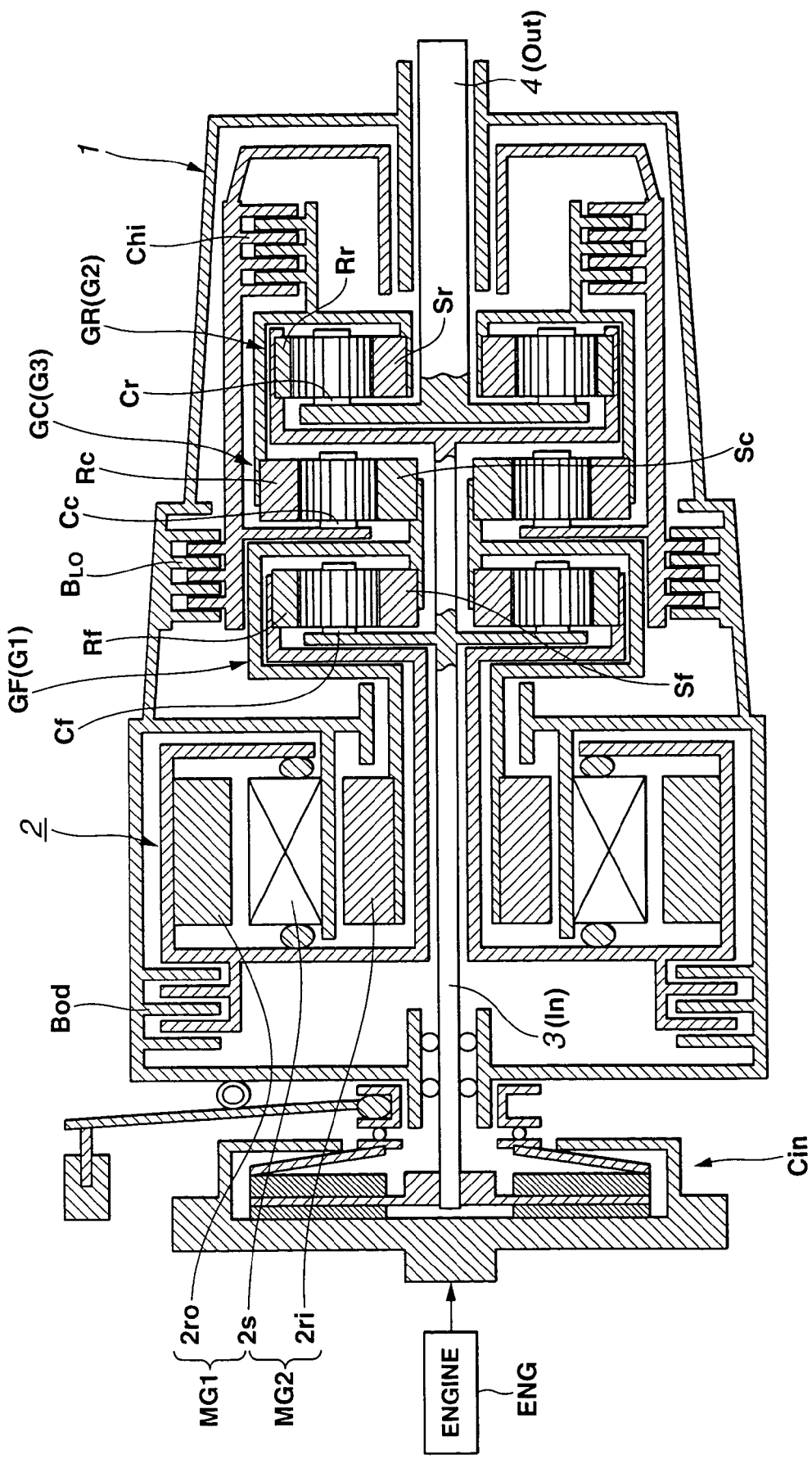
FIG. 1 is a longitudinal cross sectioned side view of a first preferred embodiment of a hybrid transmission according to the present invention.

FIG. 1 shows a hybrid transmission in a first preferred embodiment according to the present invention. In this embodiment, the hybrid transmission is suitable for a transmission of a front-engine-and-rear-drive (FR) vehicle.

In FIG. 1, reference numeral 1 denotes a transmission casing. In transmission casing 1, three simple planetary gear sets at a right end (rear end most far way from an engine ENG and in an axial direction (horizontal direction as viewed through FIG. 1) thereof are aligned coaxially. That is to say, three simple planetary gear sets are a front side planetary gear set GF located at a position nearest to engine ENG, a center planetary gear set GC, and a rear side planetary gear set GR. In addition, in transmission casing 1, a motor/generator couple which is constituted by, for example, a compound-current double-layer motor 2 is coaxially disposed with respect to three planetary gear sets at a leftmost side of casing 1 (front side nearest to engine ENG).

Front side planetary gear set GF constitutes a first differential unit G1 according to the present invention, center planetary gear set GC constitutes a third differential unit G3, and rear side planetary gear set GR constitutes a second differential unit G2 according to the present invention. It is noted that each of these front side, center, and rear side planetary gear sets GF, GC, and GR constitutes a differential unit having two degrees of freedom and having three revolvable members (elements) of a sun gear Sf, Sc, and Sr, a ring gear Rf, Rc, and Rr, and a carrier Cf, Cc, and Cr. An input axle 3 (denoted by an input portion In within a lever diagram as will be described later) to which a revolution of engine ENG is inputted via a dry-type clutch Cin is coupled to carrier Cf and ring gear Rr. In addition, an output axle 4 coaxially disposed on input axle 3 is coupled to carrier Cr of rear side differential unit GR.

Compound-current double-layer motor 2 includes an inner rotor 2ri, an annular shaped outer rotor 2ro enclosing inner rotor 2ri, these inner and outer rotor being rotatably supported coaxially on transmission casing 1. An annular stator 2s coaxially disposed in an annular space provided between inner rotor 2ri and outer rotor 2ro is fixedly installed in transmission casing 1. Annular stator 2s and outer rotor 2ro constitute a first motor/generator MG1 which is an outer motor/generator and annular stator 2s and inner rotor 2ri constitute a second motor/generator MG2 which is an inner motor/generator. It is noted that each of the first and second motor/generators functions as a motor outputting the revolution of a direction and a speed (a stop inclusive) in accordance with a supply current when the compound current is supplied with a motor side as a load and functions as a generator which develops an electric power in accordance with the revolution thereof by means of an external force when the compound current is applied with the generator side as the load.

First motor/generator MG1 (outer rotor 2ro) is coupled to ring gear Rf and second motor/generator MG2 (inner rotor 2ri) is coupled to mutually coupled sun gears Sf and Sc. Ring gear Rc and sun gear Sr are mutually coupled so that these coupled revolvable elements are enabled to be coupled to carrier Cc by means of a high-clutch Chi and this carrier Cc is enabled to be fixed to casing 1 with low brake $B_{LO}$. Ring gear Rf of front side differential unit GF is enabled to be fixed by means of an overdrive brake Bod.

Figure 2:
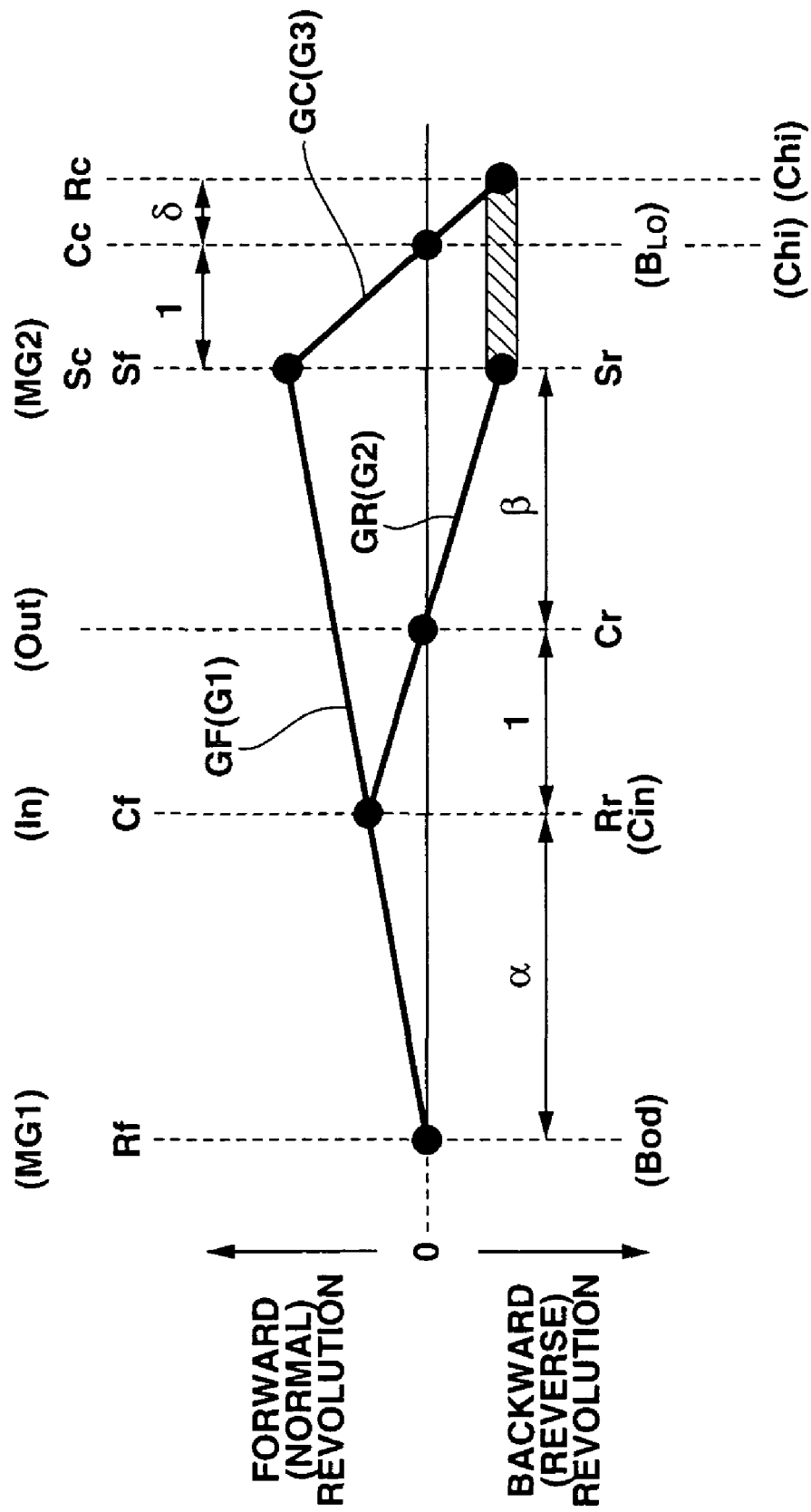
FIG. 2 is a lever diagram of the hybrid transmission in the first preferred embodiment shown in FIG. 1.

The hybrid transmission as described above is represented in a lever diagram shown in FIG. 2. An order of revolution speed of the revolvable elements in front side planetary gear sets Gf constituting first differential unit G1 is as follows: ring gear Rf, carrier Cr, and sun gear Sf. Another order of revolution speed of elements in rear side planetary gear set GR constituting second differential unit G2 is ring gear Rr, carrier Cr, and sun gear Sr.

Carrier Cf which is a middle of the revolution speed order in front side planetary gear set GF is mutually coupled to ring gear Rr which is in a fastest of the revolution speed order in rear side planetary gear set GR. Sun gear Sr which is the third fastest in the revolution speed order in rear side planetary gear set GR is mutually coupled to sun gear Sf which is the third fastest in the revolution speed order in front side planetary gear set GF. Ring gear Rc and sun gear Sc in center planetary gear set GC constituting third differential unit G3. In addition, a low brake $B_{LO}$ is disposed to fix carrier Cc of center planetary gear set GC and a high-clutch Chi which mutually couples Cc and ring gear Rc of center planetary gear set GC.

First motor/generator MG1 is coupled to ring gear Rf of front side planetary gear group GF. An input portion In from engine ENG is coupled to carrier Cf of front side planetary gear set GF. An output portion Out to a road wheel drive system is coupled to carrier Cr of rear side planetary gear set GR. Second motor/generator MG2 is coupled to sun gear Sf of front side planetary gear set GF.

In FIG. 2, a lateral axis denotes a ratio of distance between revolvable elements determined according to gear ratios of planetary gear sets GF and GR, viz., a ratio of distance between carrier Cr and sun gear Sr (sun gear Sf) when a distance from sun gear Sc to carrier Cc is set to be 1 is represented as 1. The ratio of distance between carrier Cr and sun gear Sr (sun gear Sf) is represented by β. The ratio of distance between carrier Cc and ring gear Rc is represented in δ when the distance between sun gear Sc and carrier Cc is 1.

In the hybrid transmission represented by the lever diagram shown in FIG. 2, the clutching of high-clutch Chi to couple carrier Cc to ring gear Rc of center planetary gear set Gc so that all revolvable elements of center planetary gear set Gc are integrally revolved. Hence, on the lever diagram of FIG. 2, sun gear Sr is made coincident with sun gears Sf and Sc. In this case, lever GR (G2) rides on lever GF(G1), a gear train constituted by planetary gear sets GF and GR provides a gear shift state represented in a straight line of four-element, two degrees of freedom. In the revolution speed order of revolvable elements, an alignment of the revolution speed order of revolvable elements is as follows: First motor/generator MG1, input portion In from engine ENG, and output portion Out toward a vehicular road wheel drive system, and second motor/generator MG2. In a first gear shift (gear ratio) mode with high-clutch Chi engaged, when second motor/generator MG2 is in the reverse (rearward) revolution state, second motor/generator MG2 is generating the power and first motor/generator MG1 is in a motor drive state. On the contrary, when second motor/generator MG2 is a forward (normal) revolution state, first motor/generator MG1 generates the power and second motor/generator MG2 is driven to function as the motor, the vehicle can be driven under a power income-and-outgo balance state, namely, a direct power distribution state. Furthermore, an output equal to or higher than engine power can be taken out by reducing a motor/generator power at a power generation side, while increasing motor/generator output at a motor driven side.

On the contrary, from the direct power distribution state, the output of the motor drive state motor/generator is reduced with a large power generating force of motor/generator to be power generated so that it is possible to make a chargeable state. It is noted that a range in which one of first and second motor/generators MG1 and MG2 which is motor driven is reduced and a range in which the other motor/generator which is developed to the power is reduced include a negative value.

A ratio (gear ratio) between input revolution speed and output revolution speed at which the revolution speed of either the first motor/generator or second motor/generator MG1 or MG2 is zeroed has two kinds. At these points, the power is not electrically transmitted and the vehicle can drive only through engine ENG. In addition, since, at the gear ratio between these points, an electrical power transmission rate whose efficiency is lower than a mechanical power transmission can be reduced, a transmission efficiency can be improved. Furthermore, with an engine output zeroed, motor drives by means of two motor/generators MG1 and MG2 permit the vehicle to run with only electrical power in an electrical vehicle (EV) mode. During the electrical vehicle run (EV run) mode, a dry type clutch Cin is interrupted to separate engine ENG from transmission. In this case, with no input of an engine load on engine ENG, a highly efficient electrical vehicle run can be achieved.

Overdrive brake Bod is operated for ring gear Rf to be fixed so that, as illustrated in a lever GF (G1) of FIG. 2, a fixed overdrive gear ratio having the revolution speed of output portion Out higher than that of input portion In can be achieved. At this time, a driving force assistance and an energy regeneration by means of second motor/generator MG2 can be achieved. A reduction of a fuel consumption can also be achieved. In addition, under this state, under a low driving force region, with both of engine ENG driven and EV run mode state, it is possible to achieve a reverse drive, a gear ratio infinite (stop), and a larger acceleration ratio.

Next, the gear shift operation will be described in a state in which low brake $B_{LO}$ is operated to fix carrier Cc in place of high-clutch Chi. In the second gear shift (gear ratio) mode in which low brake $B_{LO}$ is operated, the revolution of sun gear Sr with respect to sun gears Sf and Sc, as shown by a lever GC (G3) of FIG. 2, indicates an opposite revolution determined according to number of teeth between ring gear Rc and sun gears Sf and Sc.

Hence, the revolution speed of output portion Out coupled to carrier Cr is lower than that first gear shift mode described above as apparent from FIG. 2. Thus, the second gear shift mode uses a region of a low-side gear ratio including the reverse (backward) gear ratio than that at which the revolution speeds of sun gear Sf and sun gear Sr indicates zero. If the revolution of input portion In is constant, the normal revolution speed of sun gear Sf by means of motor/generator MG2 is made high so that the reverse revolution of ring gear Rc is raised and the revolution of output portion Out is reduced. Thus, the gear ratio can be transferred to the low side gear ratio region. Furthermore, a transfer from the gear ratio of a low side infinite (the vehicle stops) to the reverse gear ratio can be carried out. During this time, when the revolution of ring gear Rf crosses zero, with the power income-and-outgo balance taken, and the vehicle is being run, the passing power of the first and second motor/generators MG1 and MG2 when the transmission gear ratio indicates infinite can be the same as the output power at the output portion Out. The passing power through first and second motor/generators MG1 and MG2 indicates zero at the other transmission gear ratio.

If, in the second gear ratio (gear shift) mode, ratios of teeth number of ring gears and sun gears of three planetary gear sets GF, GC, and GR are selected appropriately, the passing power of each of motor/generators MG1 and MG2 can be reduced to a value smaller than that in the first gear shift (gear ratio) mode, a highly efficient and large-drive torque in the low-side gear ratio can be achieved by means of small-capacity motor/generators MG1 and MG2. In the first embodiment described above, in any gear ratio mode described above, since first and second motor/generators MG1, MG2 is not present on output portion of the transmission and is located remotely from the output portion of the transmission, passing powers through motor/generators MG1 and MG2 are not so large, a miniaturization of the motor/generator portions can be achieved and a transmission gear ratio width through which the engine power can be transmitted can be widened. Action and advantage in the first embodiment will be described with reference to FIG. 27.

Figure 27:
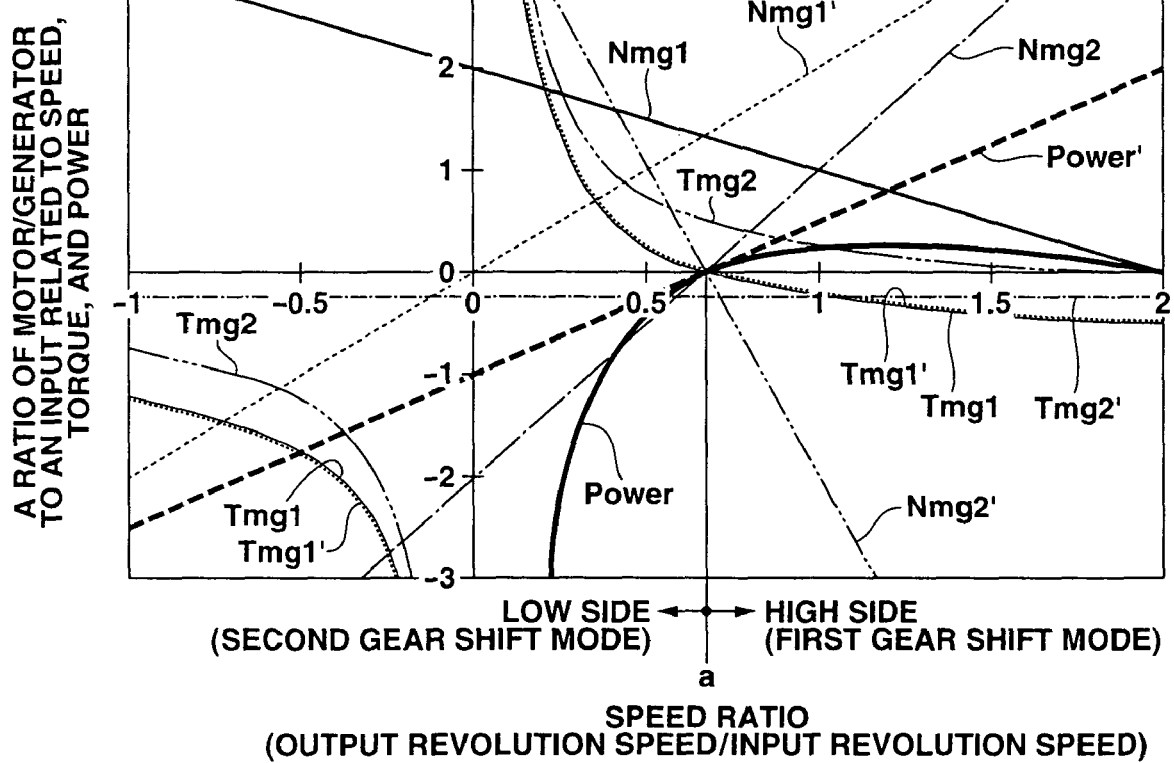
FIG. 27 is a characteristic graph of the hybrid transmission in the first embodiment shown in FIGS. 1 and 2.

FIG. 27 shows revolution speeds Nmg1 and Nmg2, torques Tmg1 and Tmg2, and passing power Power of the first and second motor/generators MG1 and MG2 in a case where high-clutch Chi is engaged (operated), and the power income-and-outgo balance is taken in the first gear shift(gear ratio) mode and in a case where revolution speeds Nmg1' and Nmg2', torques Tmg1' and Tmg2', and passing power Power' in a case where, in the second gear shift (gear ratio) mode in which the power income-and-outgo balance is taken are normalized by the revolution speed, the torque, and the power in the input portion of the transmission and shows them as a function of a speed ratio (inverse number of the gear ratio) defining the output revolution speed with respect to the input revolution speed of the transmission. In the first embodiment, the second gear ratio mode is selected in the low-side transmission gear ratio region including the reverse gear ratio than the gear ratio (denoted by a in FIG. 27) at which the revolutions of sun gears Sf (Sc) and Sr are zeroed. When the first gear ratio mode at the high-side gear ratio region is selected, the passing power of motor/generators MG1 and MG2 traces power characteristic Power smaller than Power' characteristic shown in FIG. 27. In addition, when the second gear ratio mode in the low-side transmission gear ratio region is selected, the passing powers of motor/generators MG1 and MG2 trace Power characteristic smaller than Power' characteristic of FIG. 27. In all transmission gear ratio regions, the passing powers of motor/generators MG1 and MG2 are reduced. Thus, the miniaturization of the motor/generators can be achieved. Then, a large torque is developed with high efficiency and the width of the gear ratio capable of transmitting the engine power can be widened.

In order to achieve the above-described action and advantage, carrier Cf which is the middle in the revolution speed order in front side planetary gear set GF constituting first differential gear unit G1 is mutually coupled to ring gear Rr which is the fastest in the revolution order in rear differential gear unit GR and center planetary gear set GC constituting third differential unit G3 is shifted to revolve sun gear Sf which is the third fastest in the revolution speed order in front side planetary gear set GF is mutually in reverse directions. Hence, the above-described action and advantage can be achieved in a compact structure only by an addition of a middle planetary gear set GC which can coaxially be arranged with respect to front side planetary gear set GF and rear side planetary gear set GR.

In order to achieve the above-described action and advantage, carrier Cf which is the middle in the revolution speed order in front side planetary gear set GF constituting first differential gear unit G1 is mutually coupled to ring gear Rr which is the fastest in the revolution speed order in rear differential gear unit GR and outer planetary gear set GC constituting third differential unit G3 is shifted to revolve sun gear Sf which is the third fastest in the revolution speed order in the front side planetary gear set GF is mutually in the reverse direction or in the same direction. Hence, the above-described action and advantage can be achieved in a compact structure only by an addition of a middle planetary gear set GC which can coaxially be arranged with respect to front side planetary gear set GF and rear side planetary gear set GR. When sun gears Sr and Sf are mutually revolved in the reverse directions or in the same direction, low brake $B_{LO}$ to fix one element (carrier Co) in the middle planetary gear set GC and high-clutch Chi to couple between two revolvable elements (carrier Cc and ring gear Rc) are disposed and an operation of low brake $B_{LO}$ causes a predetermined gear ratio revolving in the reverse direction and an operation of high-clutch Chi causes the predetermined rate revolving in the same direction to be enabled to be selected. Hence, a simple operation of high-clutch Chi and low brake $B_{LO}$ permits the above-described action and advantage to be achieved. Furthermore, while the predetermined gear ratio which reverses sun gears Sf and Sr are zeroed. Hence, a sufficient driving force can be developed as described above.

Planetary gear sets GF, GR, and GC constituting first, second, and third differential units G1, G2, and G3 are integrated and coaxially arranged with respect to engine ENG and both of first motor/generators MG1 and MG2 are integrated and coaxially disposed. In the first embodiment, the above-described action and advantage can be achieved in a compact structure. In addition, in the first embodiment, since output side motor/generator MG2 (inner rotor $2ro$) which is revolved at high speed and which is located near output portion Out in the lever diagram of FIG. 2 is coupled to sun gears Sf and Sc whose diameter is small, these sun gears do not develop a large centrifugal force and this is advantageous in a point of durability. Furthermore, a multiple axle structure passing through a center portion of compound-current double layer motor 2 can be suppressed to a tri-axle structure. Hence, an excessively large sizing in a radial direction of the hybrid transmission can be avoided.

(Second Embodiment)

Figure 3:
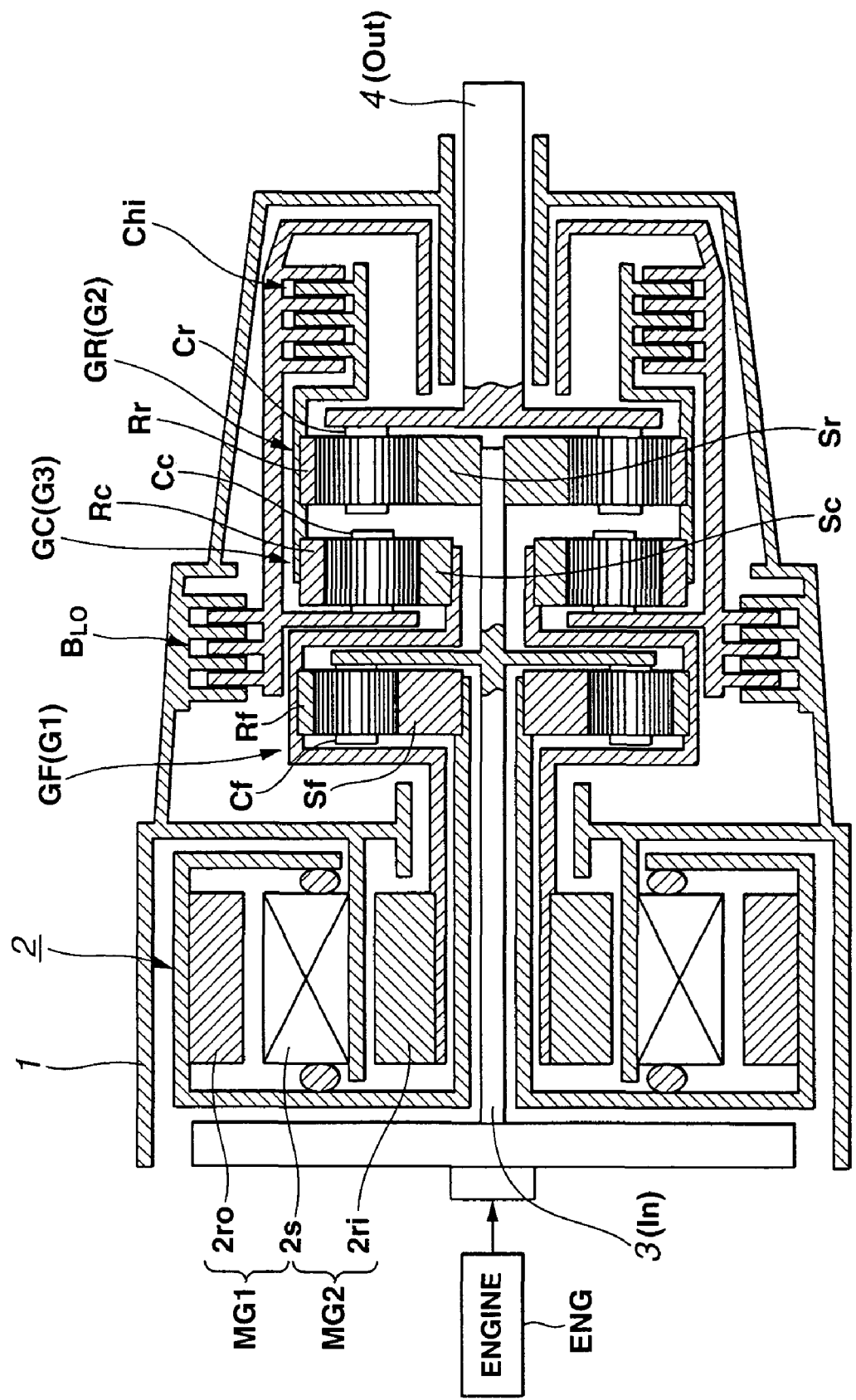
FIG. 3 is a longitudinal cross sectioned side view of a second preferred embodiment of the hybrid transmission shown in FIG. 1.
Figure 4:
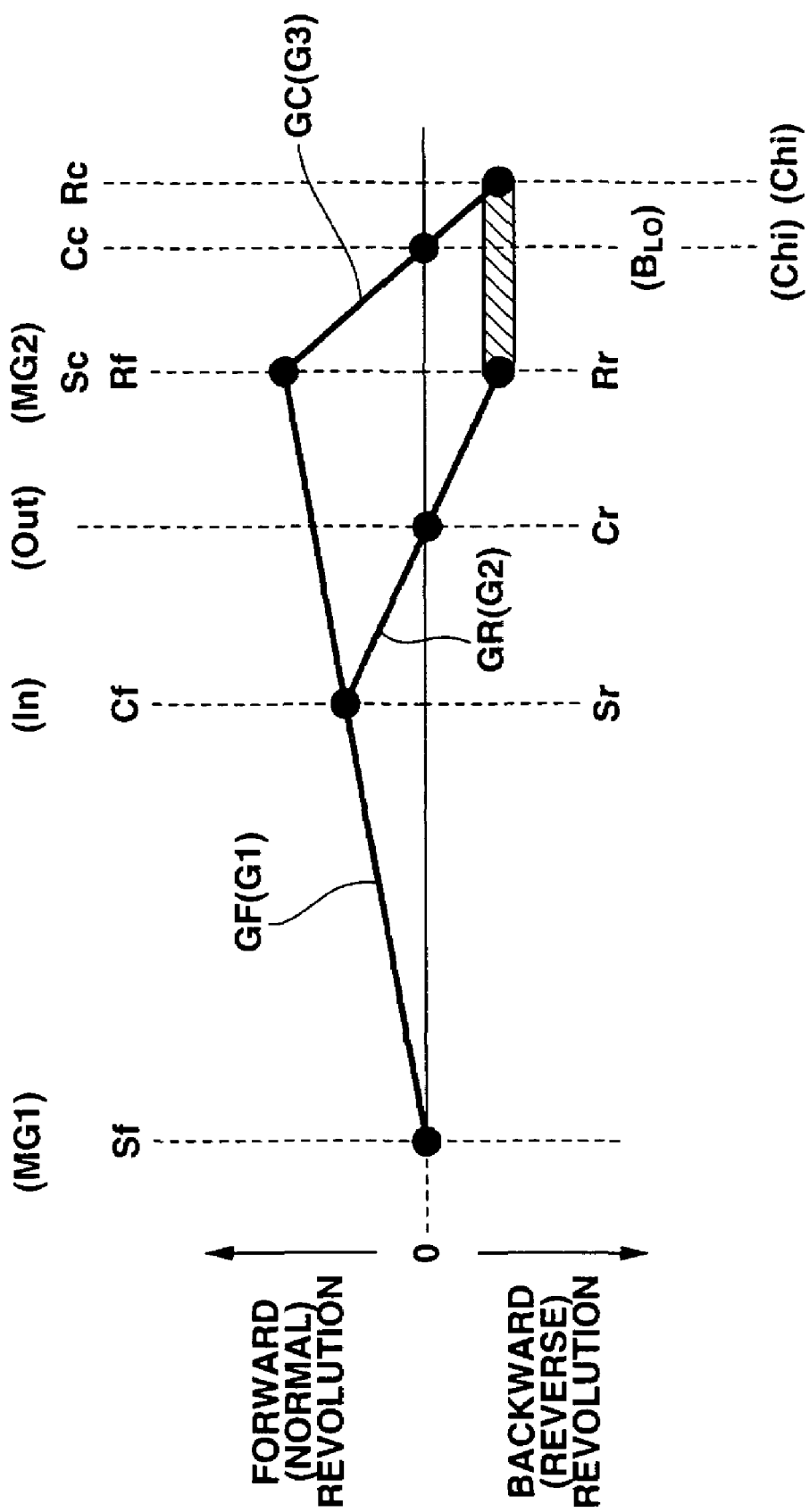
FIG. 4 is a lever diagram of the hybrid transmission in the second preferred embodiment of the hybrid transmission shown in FIG. 3.

FIG. 3 shows a hybrid transmission in a second preferred embodiment according to the present invention. FIG. 4 shows a lever diagram of the hybrid transmission in the second embodiment shown in FIG. 3. In the same way as described in the first embodiment, front side planetary gear set GF constitutes first differential unit G1 according to the present invention, center planetary gear set GC constitutes third differential unit G3, and rear side planetary gear set GR constitutes the second differential unit G2 according to the present invention. In the second embodiment, carrier Cf and sun gear Sr are coupled to input axle 3 to which the revolution of engine ENG is inputted (as denoted by input portion In within the lever diagram in FIG. 4) and output axle 4 (as denoted by output portion Out in the lever diagram of FIG. 4) is coupled to carrier Cr.

In other words, in the low-side gear ratio region including the reverse gear ratio than the gear shift ratio (denoted by a in FIG. 27) at which revolutions of ring gears Rf (or sun gear Sc) and Rr are zeroed, low bake $B_{LO}$ is clutched (operated) so that the gear ratio mode shift to a second predetermined gear ratio at which the revolutions of the sun gears(Sr and Sf) is reversed is carried out and, in the high side gear ratio region, high-clutch Chi is clutched (operated) so that the sun gears described above are mutually revolved in the same direction in the first gear shift mode is carried out. In high-side transmission ratio region, high-clutch Chi is clutched to make the gear shift at the first gear ratio mode. Since motor/generators MG1 and MG2 are not present on output portion of the transmission, the passing power to motor/generators MG1 and MG2 is not large as described in the first embodiment with reference to FIG. 27. The miniaturization of motor/generator(s) can be achieved and the width of the gear ratio at which a large torque can be developed with high accuracy of the engine power.

(Third Embodiment)

Figure 5:
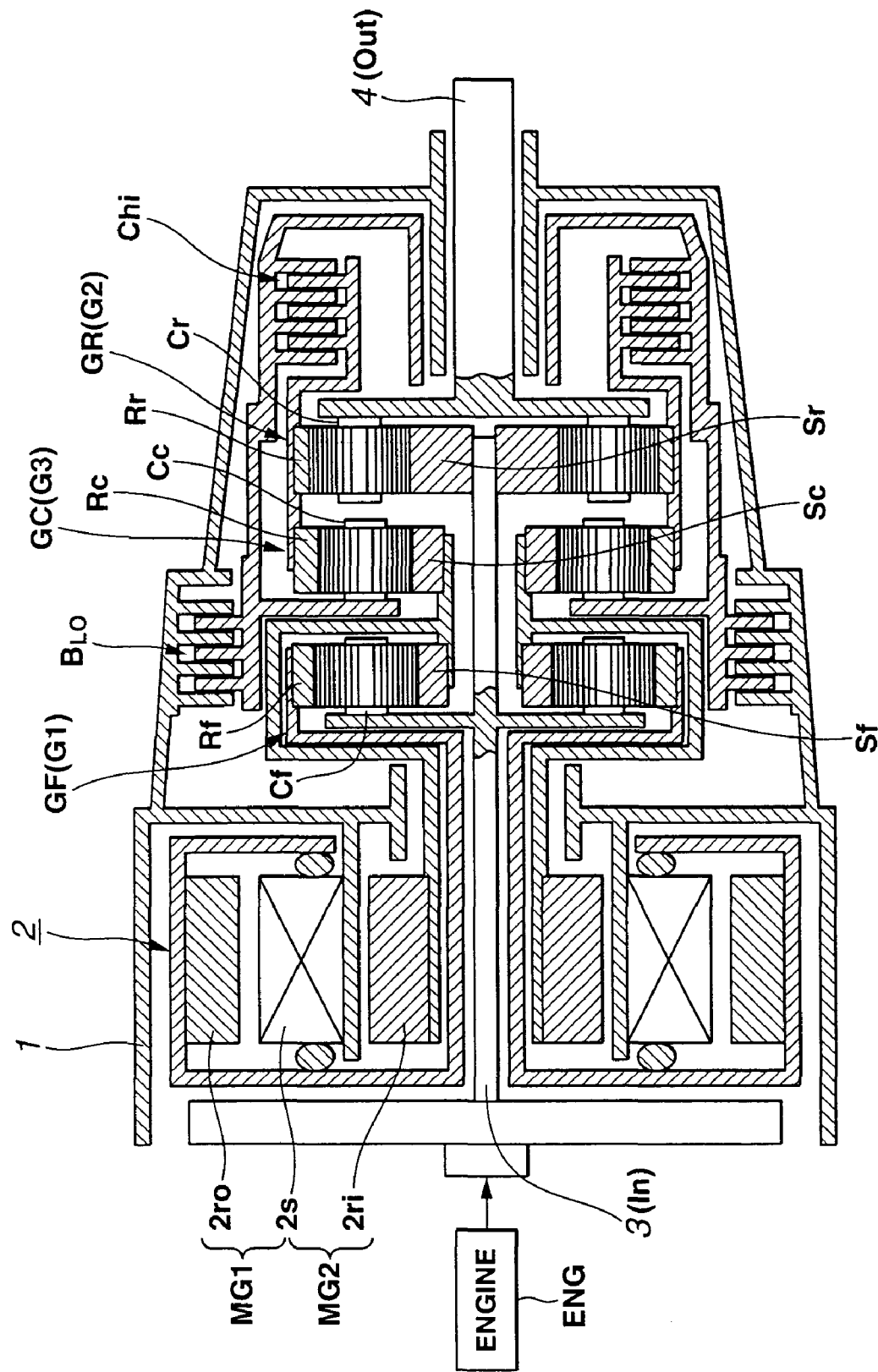
FIG. 5 is a longitudinally cross sectioned side view of a third preferred embodiment of the hybrid transmission according to the present invention.
Figure 6:
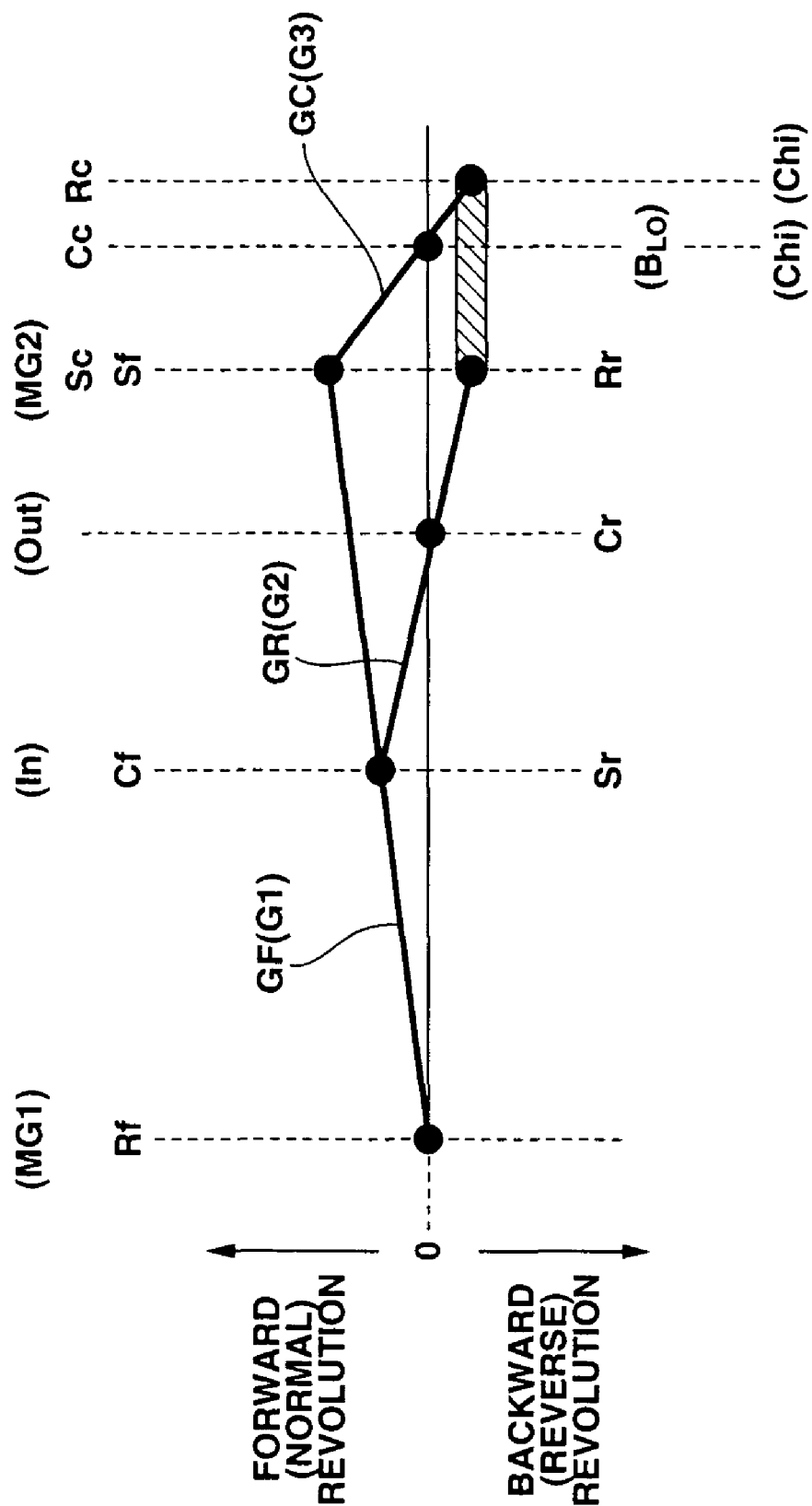
FIG. 6 is a lever diagram of the hybrid transmission in the second preferred embodiment of the hybrid transmission shown in FIG. 3.

FIG. 5 shows a hybrid transmission in a third preferred embodiment according to the present invention. FIG. 6 shows the lever diagram of the hybrid transmission shown in FIG. 5. As described in each of the first and second embodiments, front side planetary gear set GF constitutes a first differential unit G1 according to the present invention, rear side planetary gear set GR constitutes second differential unit G2, and center planetary gear set GC constitutes third differential unit G3.

In the same way as described in the cases of FIGS. 1 and 2, sun gears Sf and Sc are mutually coupled and integrated in the same way as the cases of FIGS. 1 and 2. The mutually coupled element is coupled to second motor/generator MG2 (inner rotor $2ri$). First motor/generator MG1 (outer rotor $2ro$) is coupled to ring gear Rf. Ring gears Rc and Rr are mutually coupled and this ring gear coupled element is enabled to be coupled to carrier Cc by means of high-clutch Chi. This carrier Cc is enabled to be fixed to casing 1 to low brake $B_{LO}$. The lever diagram of the hybrid transmission in the third embodiment is shown in FIG. 6. This lever diagram is modified due to the above-described coupling relationship between the coupling elements. Except the above-described fact, the lever diagram shown in FIG. 6 is the same as each of those shown in FIGS. 2 and 4 of the previous embodiments and the action and advantage are the same as described in each of the previous embodiments. In other words, in the low side gear ratio region including the reverse gear ratio than the gear ratio (denoted by a in FIG. 27) at which revolutions of sun gears Sf (Sc) and ring gear Rr are zeroed, low brake $B_{LO}$ is clutched so that the gear shift at the second gear ratio mode is carried out and, in the high side gear ratio region, high-clutch Chi is clutched to perform the gear shift at the first gear shift mode.

In either one of first gear ratio mode and second gear ratio mode, the first and second motor/generators MG1 and MG2 are not present on the output portion, the passing powers of motor/generators MG1 and MG2 are not present. Hence, as described in the first embodiment with reference to FIG. 27, the passing powers to both of motor/generators MG1 and MG2 are not large. Thus, the miniaturization of motor/generators can be achieved and the width of the gear ratio at which a large torque is developed and the engine power is transmissible can be widened.

(Fourth Embodiment)

Figure 7:
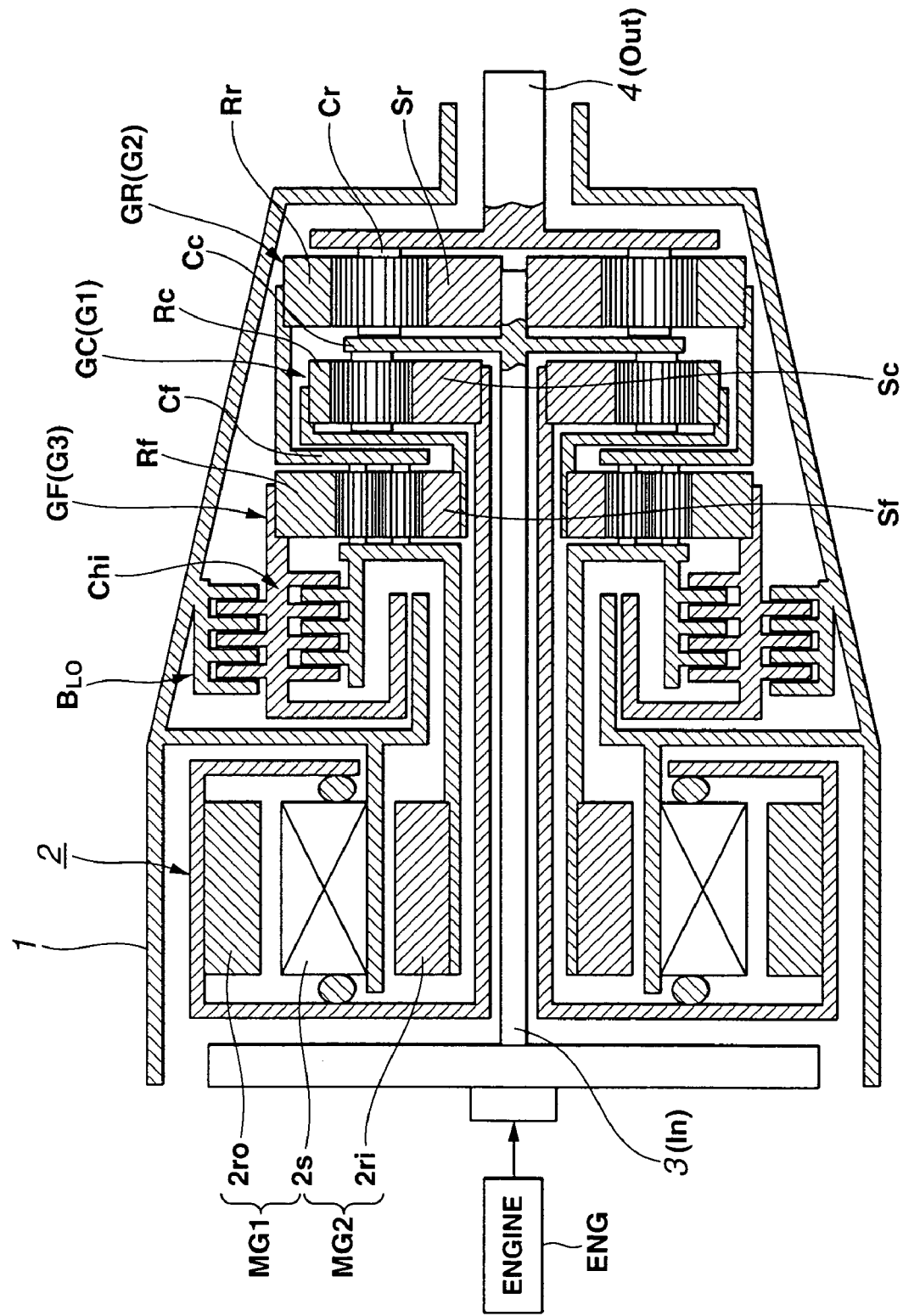
FIG. 7 is a longitudinal cross sectioned side view of a fourth preferred embodiment of the hybrid transmission according to the present invention.
Figure 8:
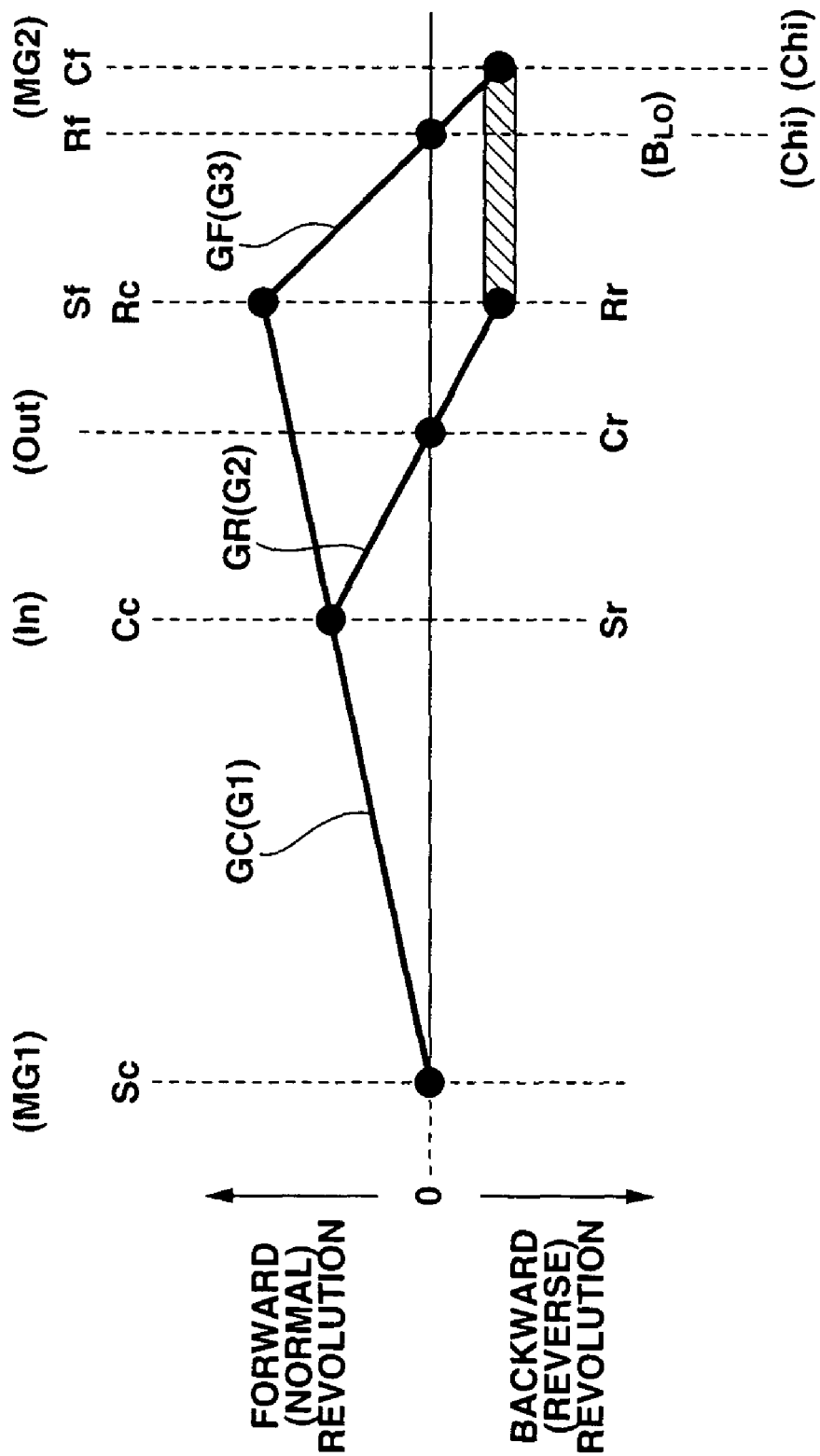
FIG. 8 is a lever diagram of the hybrid transmission in the fourth embodiment shown in FIG. 7.

FIG. 7 shows a fourth preferred embodiment of the hybrid transmission and FIG. 8 shows the lever diagram of the hybrid transmission shown in FIG. 7. In the fourth embodiment, front side planetary gear GF placed nearest to engine ENG in a double pinion planetary gear set constituting third differential unit G3 and center and rear side planetary gear sets GC and GR are simple planetary gear sets and constitute first differential unit G1 and second differential unit G2. These three planetary gear sets are coaxially arranged on engine ENG and are housed within transmission casing 1. Input axle 3 at which the revolution of engine ENG is inputted (in FIG. 8, input portion IN) is coupled to carrier Cc and sun gear Sr and output axle 4 (in FIG. 8, output portion Out is shown) is coupled to carrier Cr. First motor/generator MG1 (outer rotor $2ro$) is coupled to sun gear Sc and second motor generator MG2 (inner rotor $2ri$) is coupled to carrier Cf. This carrier Cf is coupled to ring gear Rr. High-clutch Chi between carrier Cf and ring gear Rf serves to enable to be coupled together. Sun gear Sf is coupled to ring gear Rc. Ring gear Rf is fixable by means of low brake $B_{LO}$. Sun gear Sf is coupled to ring gear Rc. When the hybrid transmission is represented in the lever diagram, the lever diagram of FIG. 8 is resulted. The revolution speed order of the elements in planetary gear set GC is as follows: sun gear Sc, carrier Cc, and ring gear Rc. The revolution speed order of rear side planetary gear set GR constituting second differential unit G2 is as follows: sun gear Sr, carrier Cr, and ring gear Rr. Carrier Cc which is a middle in the revolution speed order in a middle planetary gear set GC is mutually coupled to sun gear Sr which is the first fastest of the revolution speed order in rear side planetary gear set GR. Ring gear Rr which is the third fastest of the revolution speed order in rear side planetary gear set GR and ring gear Rc which is the third fastest of the revolution speed order in the middle planetary gear set GC are coupled to carrier Cf and sun gear Sf, respectively, which are in front side planetary gear set GF constituting third differential unit G3. In addition, low brake $B_{LO}$ which enables to fix ring gear Rf of front side planetary gear set GF is disposed and high-clutch Chi which enables to mutually couple carrier Cf and ring gear Rf of front side planetary gear set GF is disposed. First motor/generator MG1 is coupled to sun gear Sc of center planetary gear set GC. Input portion In from engine ENG is coupled to carrier Cc of center planetary gear set GC. An output portion Out to the vehicular drive system is coupled to carrier Cr of rear side planetary gear set GR. Second motor/generator MG2 is coupled to carrier Cf of front side planetary gear set GF. The hybrid transmission lever diagram shown in FIG. 8 is the same as the lever diagram (FIGS. 2, 4, and 6) in the previously described elements. By a proper use of first gear ratio mode in which carrier Cf and ring gear Rf are coupled due to the clutch of high-clutch Chi and of the second gear ratio mode in which ring gear Rf is fixed by the operation of low brake $B_{LO}$, in other words, by using the second gear ratio mode in the low side transmission ratio region including the backward (reverse) gear ratio than the gear ratio (denoted by a in FIG. 27) and using the first gear shift mode in the high-side gear ratio region, no portion of transmission of first and second motor/generators MG1 and MG2 is positioned on the output portion of the transmission and the passing powers to motor/generators are not so large. The miniaturization of motor/generator can be achieved and the width of the gear ratio capable of transmitting the engine power with a large torque can be widened with high efficiency. In addition, since front side planetary gear set GF constituting third differential unit G3 is averaged in a double pinion planetary gear set. The gear ratio can accordingly be widened and miniaturization of motor/generators MG1 and MG2 can be realized.

(Fifth Embodiment)

Figure 9:
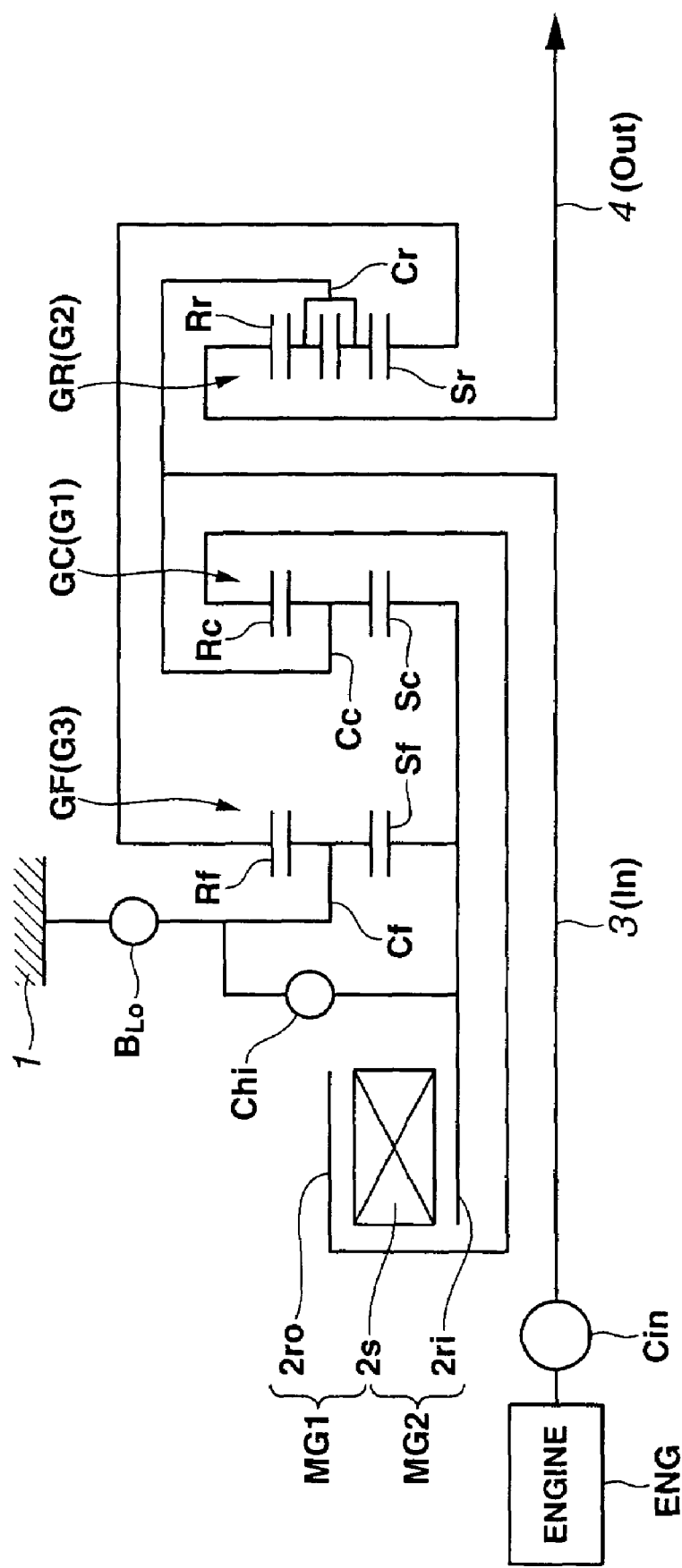
FIG. 9 is a coupling-and-block diagram of a fifth preferred embodiment of the hybrid transmission according to the present invention.
Figure 10:
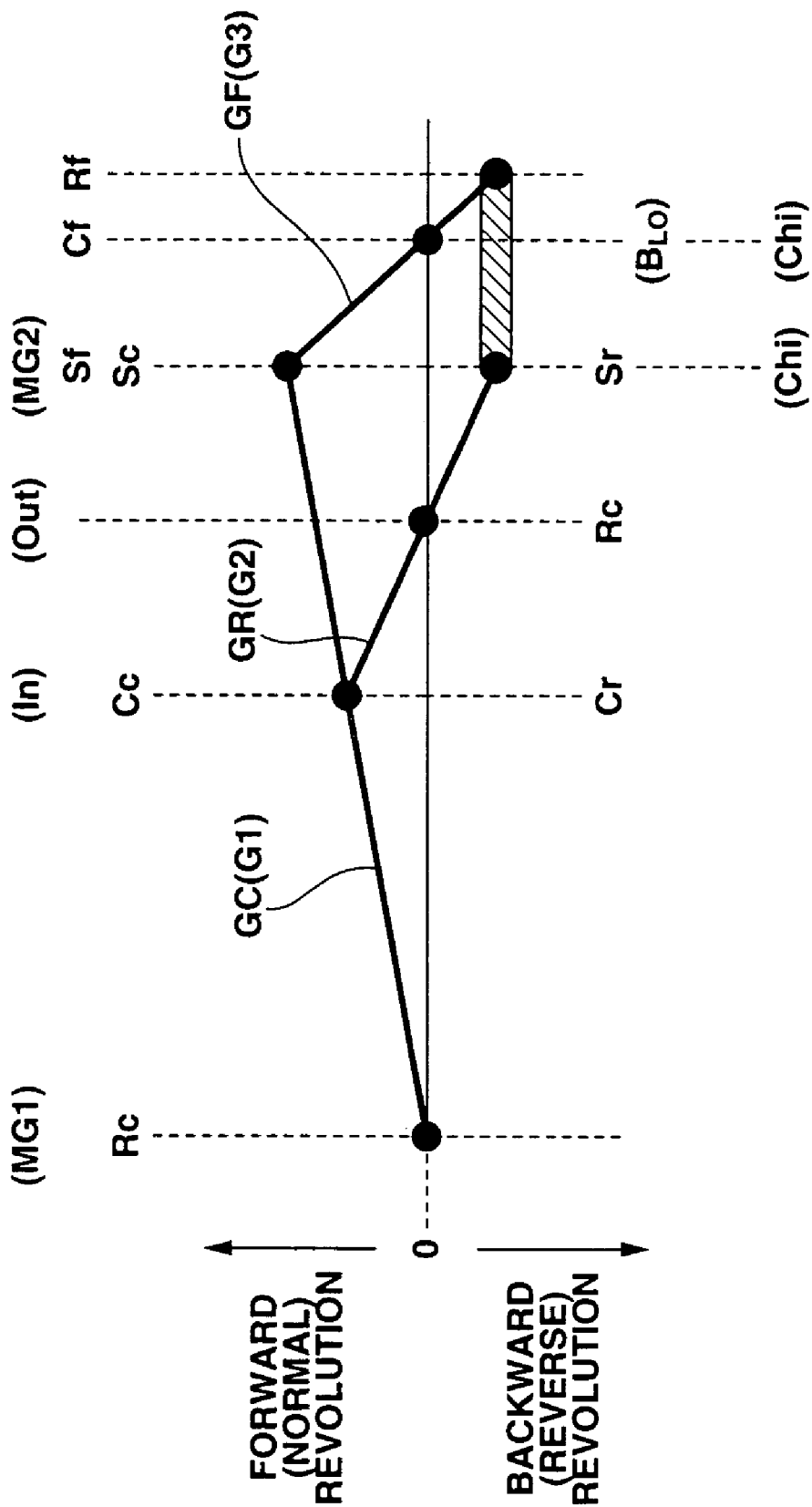
FIG. 10 is a lever diagram of the hybrid transmission shown in FIG. 9.

FIGS. 9 and 10 show a fifth preferred embodiment of the hybrid transmission according to the present invention and its lever diagram.

In the fifth embodiment, rear side planetary gear set GR which is located most far away from engine ENG is the double pinion planetary gear set constituting second differential unit G2 according to the present invention, and center and front side planetary gear sets GC and GF are the simple planetary gear sets constituting first and third differential gear units G1 and G3. These three planetary gear sets are coaxially mounted within transmission casing 1 with respect to engine ENG. Carriers Cc and Cr are coupled to input axle 3 (input portion In within the lever diagram of FIG. 10) on which the revolution of engine ENG is inputted via dry type clutch Cin and ring gear Rr is coupled to output axle 4 (output portion Out corresponds to the lever diagram of FIG. 10). First motor/generator MG1 (outer rotor 2*ro*) is coupled to ring gear Rc and second motor/generator MG2 (inner rotor 2*ri*) is coupled to sun gear Sf. Sun gear Sf is coupled to sun gear Sc. High-clutch Chi serves to couple carrier Cf and sun gear Sf. Carrier Cf is fixable by means of low brake $B_{LO}$. Ring gear Rf is coupled to sun gear Sr. The lever diagram of hybrid transmission is shown in FIG. 10. The revolution speed order of the elements in center planetary gear set GC constituting first differential unit G1 is as follows: ring gear Rc, carrier Cc, and sun gear Sc. The revolution speed order of rear side planetary gear set GR constituting second differential unit G2 is as follows: carrier Cr, ring gear Rr, and sun gear Sr. Carrier Cc which is the middle in the revolution speed order in center planetary gear set GC is mutually coupled to carrier Cr which is the fastest in the revolution order in the rear side planetary gear set GR. Sun gear Sr which is the third fastest in the revolution speed order of rear side planetary gear set GR and sun gear Sc which is the third fastest in the revolution speed order of center planetary gear set GC are coupled to ring gear Rf and sun gear Sf of front side planetary gear set GF constituting third differential unit G3. In addition, the lever diagram of the hybrid transmission described above is generally the same as that in each of the previously explained diagram (FIGS. 2, 4, 6, and 8) described in each of the previously described embodiments. By a proper use of a first gear ratio mode in which carrier Cf and sun gear Sf are coupled together due to the clutching of high-clutch Chi and a second gear ratio mode in which the operator of low brake $B_{LO}$ causes carrier Cf to be fixed, in other words, at a low-side transmission gear ratio region including the reverse gear ratio rather than the gear ratio (denoted by a of FIG. 27) at which the revolutions of sun gear Sc (sun gear Sf), sun gear Sr are zeroed. Then, in the high side transmission ratio region, the first gear shift is used. Thus, at any gear ratio mode, both of first and second generators MG1 and MG2 are not present on the output portion of the transmission. Hence, since due to the fact that the passing powers through motor/generators MG1 and MG2 are not large as described in the first embodiment with reference to FIG. 27. Thus, the miniaturization of each motor/generator can be achieved and the large torque can be developed at a high frequency. Then, the width of the gear ratio which is enabled to transmit the engine power can be widened. In addition, since, in the fifth embodiment, output side motor/generator MG2 (inner rotor 2*ro*) which is located near to output (Out) on the lever diagram of FIG. 10 and which is revolved at high speeds are coupled to sun gears Sf and Sc whose diameter becomes small, even if these sun gears are revolved at high speeds, a large centrifugal force is not developed and it is advantageous in terms of durability.

Furthermore, since the multi-axle structure such that the axis passes through the center portion of compound current double layer motor 2 present in between engine ENG and planetary gear sets GF, GC, and GR, it can be avoided that a dimension of the radial direction of hybrid transmission can be avoided from being increased.

(Sixth Embodiment)

Figure 11:
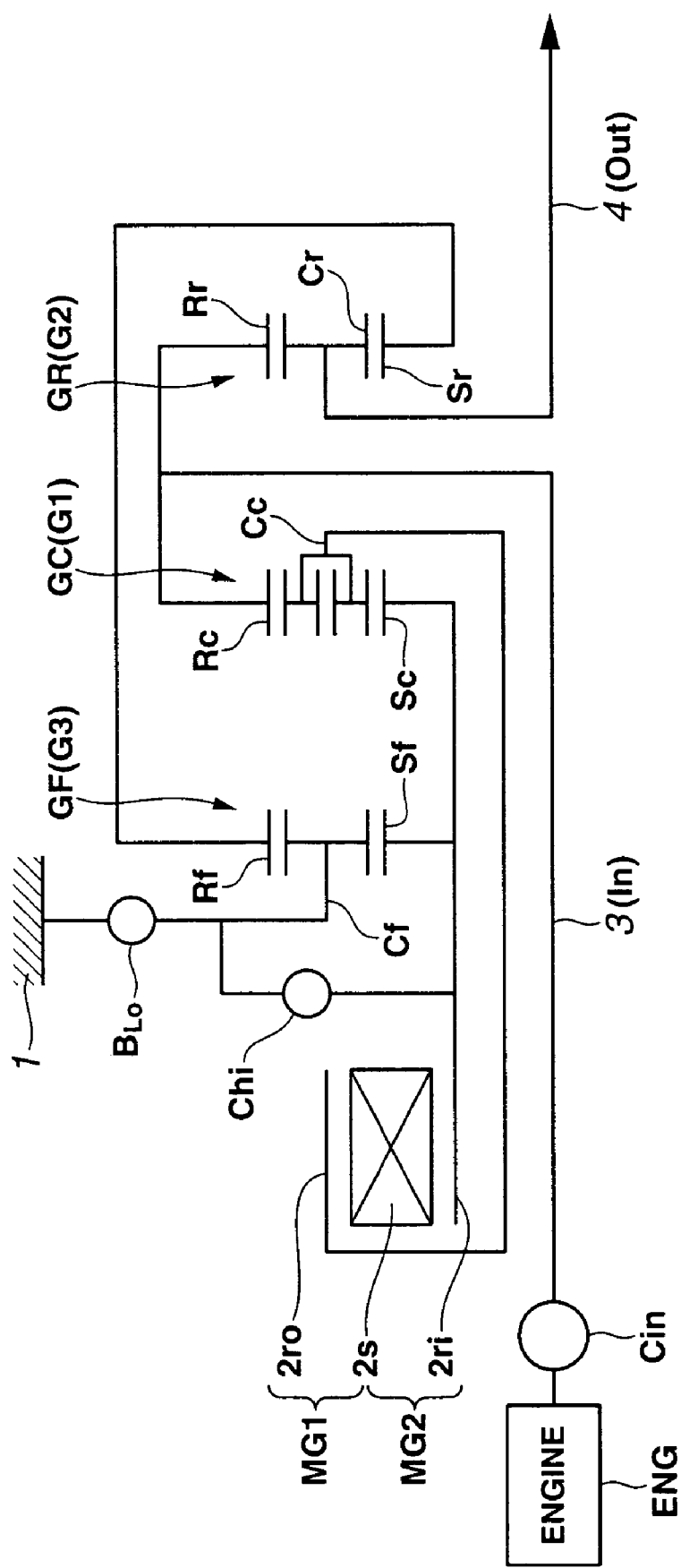
FIG. 11 is a coupling-and-block diagram of a sixth preferred embodiment of the hybrid transmission according to the present invention.
Figure 12:
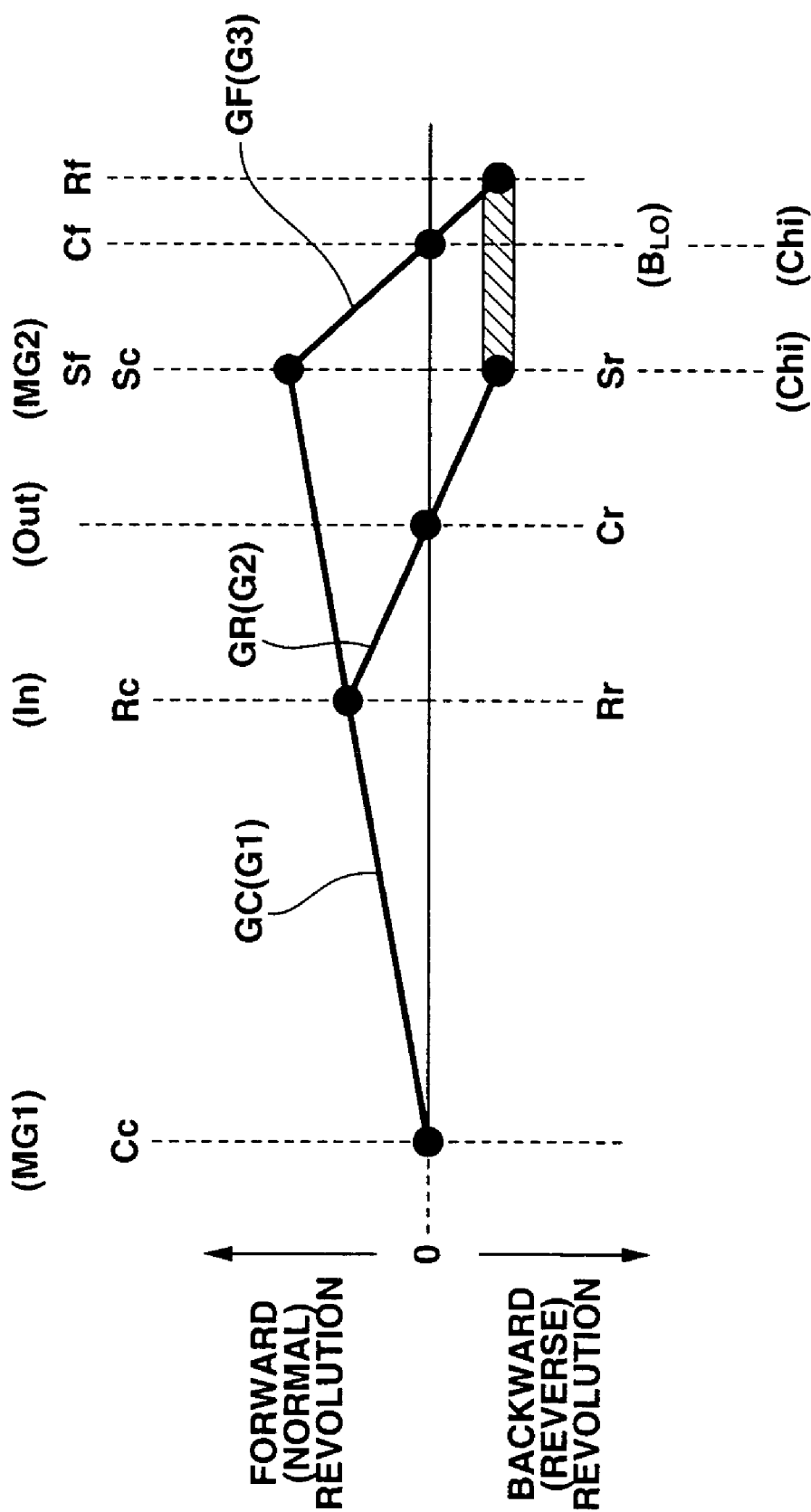
FIG. 12 is a lever diagram of the hybrid transmission shown in FIG. 11.

FIGS. 11 and 12 show a sixth preferred embodiment of the hybrid transmission according to the present invention and its lever diagram. As shown in FIG. 11, center planetary gear set GC is the double pinion planetary gear set constituting first differential unit G1 according to the present invention, rear side planetary gear set GR which is located most far away from engine ENG and constitutes the simple planetary gear set of second differential unit G2, and front side planetary gear unit GF which is located nearest to engine ENG and constitutes simple planetary gear set of third differential unit G3. These three planetary gear sets are coaxially disposed on engine ENG and housed within transmission casing 1. Ring gear Rc and carrier Cr are coupled to input axle 3 (denoted by input portion In within the lever diagram of FIG. 12) to which the revolution of engine ENG is inputted and ring gear Rr is coupled to output axle 4 (as denoted by (output portion) Out in the lever diagram of FIG. 12). First motor/generator MG1 (outer rotor 2*ro*) is coupled to carrier Cc and second motor/generator MG2 (inner rotor 2*ri*) is coupled to sun gear Sf. This sun gear Sf is coupled to sun gear Sc. High-clutch Chi enables the coupling between carrier Cf and sun gear Sf, low brake $B_{LO}$ enables the fixation of carrier Cf, and ring gear Rf is coupled to sun gear Sr.

FIG. 12 shows the lever diagram of the hybrid transmission described above in the sixth embodiment. The revolution speed order of the elements in center planetary gear set GC constituting first differential gear G1 is as follows: carrier Cc, ring gear Rc, and sun gear Sc. The revolution speed order of the elements in rear side planetary gear set GF constituting second differential gear set G2 is as follows: ring gear Rr, carrier Cr, and sun gear Sr.

Ring gear Rc which is the middle in the revolution speed order in center planetary gear set GC is mutually coupled to ring gear Rr which is the fist fastest in the revolution speed order in rear side planetary gear set GR. Sun gear Sr which is the third fastest in the revolution speed order in rear side planetary gear set GR sun gear Sc which is the third fastest in the revolution speed order in the center planetary gear set GC are respectively coupled to ring gear Rf and sun gear Sf in front side planetary gear set GF constituting third differential unit G3. In addition, low brake $B_{LO}$ which serves to fix carrier Cf of front side planetary gear set GF is disposed and high-clutch Chi which serves to mutually couple carrier Cr and sun gear Sf of front side planetary gear set CF is installed. First motor/generator MG1 is coupled to carrier Cc of center planetary gear set GC, input portion In from engine ENG is coupled to ring gear Rc of center planetary gear set Gc. Output portion Out to vehicular road wheel drive system is coupled to carrier Cr of rear side planetary gear set GR, and second motor/generator MG2 is coupled to sun gear Sf of front side planetary gear set GF.

The above-described hybrid transmission in the sixth embodiment is represented in the lever diagram of FIG. 12. The lever diagram shown in FIG. 12 is the same as that (FIGS. 2, 4, 6, 8, and 10) described in each of the first through fifth embodiments. Hence, according to a proper use of the first gear ratio mode in which carrier Cf and sun gear Sf are coupled due to the clutching of high-clutch Chi and the second gear ratio mode in which carrier Cf and sun gear Sf are coupled due to the clutching of high-clutch Chi and the second gear ratio mode in which the low brake $B_{LO}$ is operated to fix carrier Cf, in other words, by the use of the second gear ratio mode in the low-side transmission gear ratio region including the reverse gear ratio rather than the gear ratio (denoted by a in FIG. 27) at which the revolutions of sun gear Sc (sun gear Sf) and sun gear Sr are zeroed and by the use of the first gear ratio mode in the high-side ratio mode, motor/generators MG1 and MG2 are not present on the output portion of the lever diagram of the hybrid transmission, the passing powers to motor/generators MG1 and MG2 do not become large as described with reference to FIG. 27. hence, the miniaturizations of the motor/generators can be achieved and the width of the gear ratio which can develop a large torque at a high efficiency and at which engine power is transmissible can be widened. Since, in the sixth embodiment, the output side motor/generator MG2 (inner rotor 2ro) which is revolved at high speed and is located near to output portion (Out) in the lever diagram of FIG. 12 is coupled to sun gears Sf and Sc whose diameters are small. Even if these sun gears Sf and Sc are revolved at high speeds, large centrifugal forces are not developed. Thus, it is advantageous in the durability. Furthermore, a multiple-axis structure passing through the center portion of the compound current double lager motor 2 present between engine ENG and planetary gear sets GF, GR, and GC can be suppressed to be the three axis structure. Hence, the enlargement of the dimension of the radial direction of the hybrid transmission can be avoided.

(Seventh Embodiment)

Figure 13:
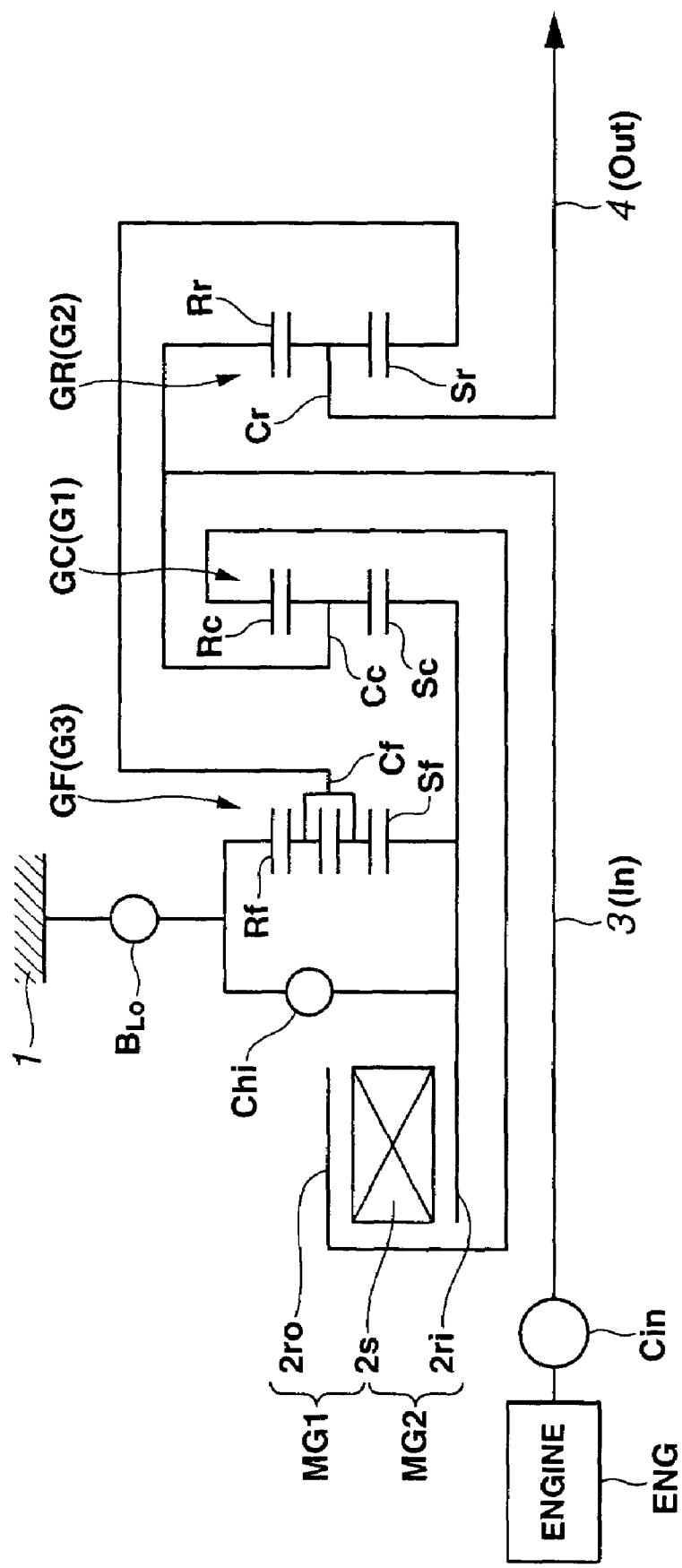
FIG. 13 is a coupling-and-block diagram of the hybrid transmission in a seventh preferred embodiment according to the present invention.
Figure 14:
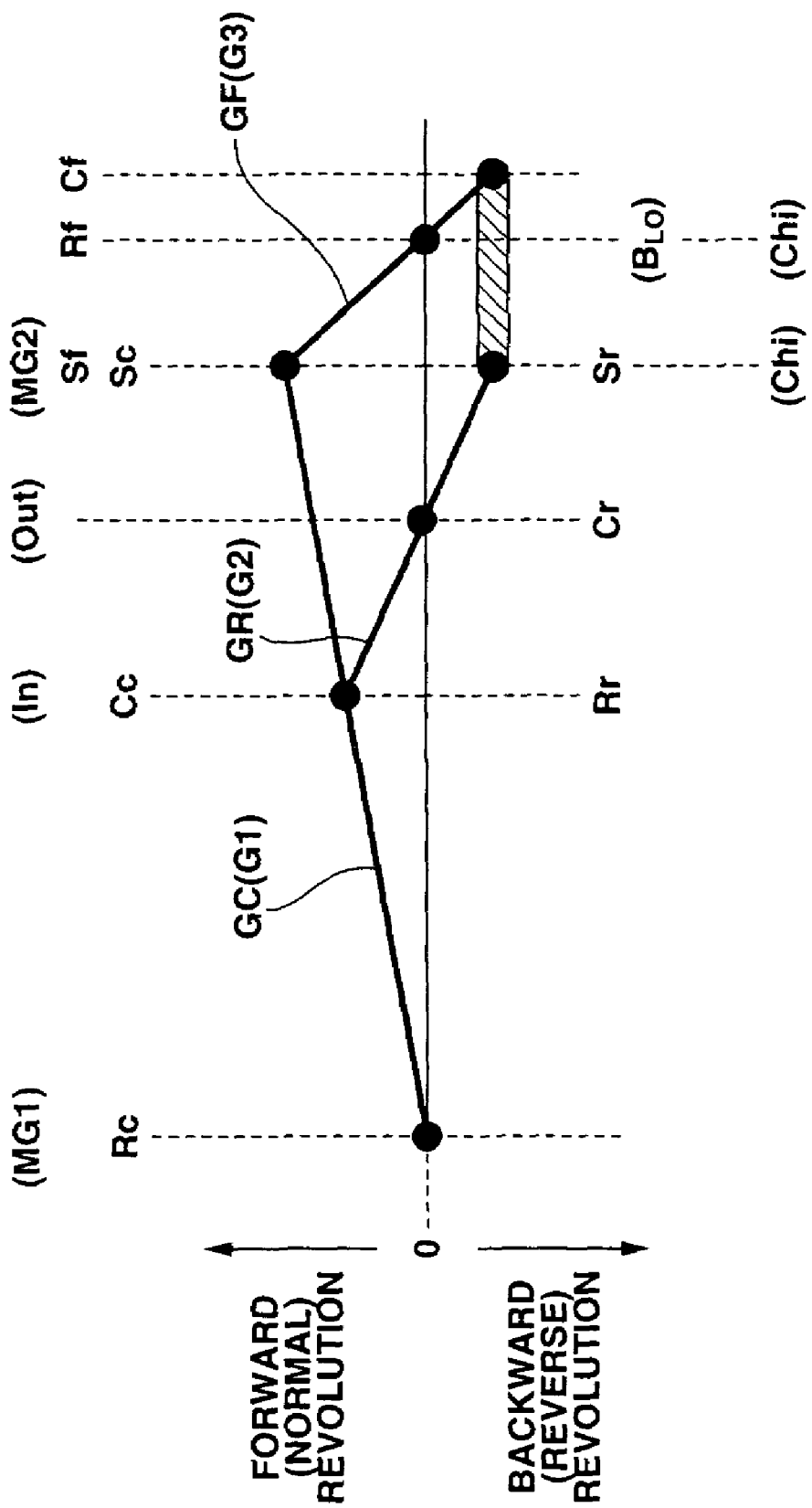
FIG. 14 is a lever diagram of the hybrid transmission shown in FIG. 13.

FIGS. 13 and 14 show a seventh preferred embodiment of the hybrid transmission and its lever diagram. In the seventh embodiment, as shown in FIG. 13, front side planetary gear GF which is located nearest to engine ENG is the double pinion planetary gear constituting third differential unit G3 according to the present invention and center planetary gear set GC and rear side planetary gear set GR which is located remotest from engine ENG are, respectively, the simple planetary gear sets to constitute first and second differential units G1 and G2. These three planetary gear sets are coaxially arranged to engine ENG and housed in transmission casing 1. Carrier Cc and ring gear Rr are coupled to input axle 3 (as denoted by input portion In within the lever diagram of FIG. 14) at which the revolution of engine ENG is inputted via dry type clutch Cin and carrier Cr is coupled to output axle 4 (as denoted by output portion Out in the lever diagram of FIG. 14). First motor/generator MG1 (outer rotor 2ro) is coupled to ring gear Rc. Sun gear Sf is coupled to sun gear Sc. High-clutch Chi enables ring gear Rf and sun gear Sf to be coupled together. This ring gear Rf is fixable to low brake $B_{LO}$. Carrier Cf is coupled to sun gear Sr. The hybrid transmission described above is represented in the lever diagram as shown in FIG. 14. The revolution speed order elements in center planetary gear set GC constituting first differential unit G1 is as follows: ring gear Rc, carrier Cc, and sun gear Sc. The revolution speed order of the elements in rear side planetary gear set GR is as follows: ring gear Rr, carrier Cr, and sun gear Sr.

Carrier Cc which is the middle in the revolution speed order is center planetary gear set GC is mutually coupled to ring gear Rr which is the first fastest in the revolution speed order in rear side planetary gear set GR. Sun gear Sr which is the third fastest in the revolution speed order of rear side planetary gear group GR and sun gear Sc which is the third fastest of the revolution speed order of center planetary gear set GC are respectively coupled to carrier Cf and sun gear Sf at front side planetary gear set GF. Low brake $B_{LO}$ serves to fix ring gear Rf of front side planetary gear set GF and high-clutch Chi serves to mutually couple ring gear Rf and sun gear Sf of front side planetary gear set GC. Then, first motor/generator MG1 is coupled to ring gear Rc of center planetary gear set GC, carrier Co of center planetary gear set GC is coupled to input portion In from engine ENG, carrier Cr of rear side planetary gear set GR is coupled to output portion (Out) to the wheel road drive system, and second motor/generator MG2 is coupled to sun gear Sf of front side planetary gear set GF.

The lever diagram of hybrid transmission in the seventh embodiment is shown in FIG. 14. The lever diagram configuration shown in FIG. 14 is the same as that (FIGS. 2, 4, 6, 8, 10, and 12) of each embodiment described above. Thus, by the proper use of the first gear ratio mode in which the clutching of high-clutch Chi causes ring gear Rf to be coupled and of low brake $B_{LO}$ is operated to fix ring gear Rf, in other words, since the use of second gear ratio mode in the low-side gear ratio region including the reverse gear ratio rather than the gear ratio (denoted by a in FIG. 27) at which the revolutions of ring gear Rf and sun gear Sf are zeroed according to the clutching of high-clutch Chi is made and the use of first gear ratio mode in the high side transmission gear region is made, in any gear ratio mode, since first and second motor/generators MG1 and MG2 are not present in the output portion of transmission. Therefore, as described in the first embodiment with reference to FIG. 27, the passing powers to motor/generators MG1 and MG2 are not increased. Consequently, the miniaturization of the motor/generators MG1 and MG2 can be achieved and the width of the gear ratio such that the large torque can be developed with high efficiency and the engine power can be transmitted can be widened. In addition, in the seventh embodiment, since the output side motor/generators MG2 (inner rotor 2ro) which revolves at high speeds and is located nearer to output portion (Out) in the lever diagram in FIG. 14 is coupled to sun gears Sf and Sc whose diameters are small, a large centrifugal force is not developed and it is advantageous in terms of durability.

Furthermore, since the multiple axis structure passing through the center of the compound current double layer motor 2 present between engine ENG and planetary gear sets GF, GR, and GC can be suppressed to the tri-axis structure, a radial directional dimension of the hybrid transmission can be avoided from being increased. Since front side planetary gear set GF constituting third differential unit G3 is constituted by the double pinion planetary gear, the width of the low-side gear ratio can be widened. Accordingly, the gear ratio can be augmented and miniaturization of motor/generators MG1 and MG2 can be realized.

(Eighth Embodiment)

Figure 15:
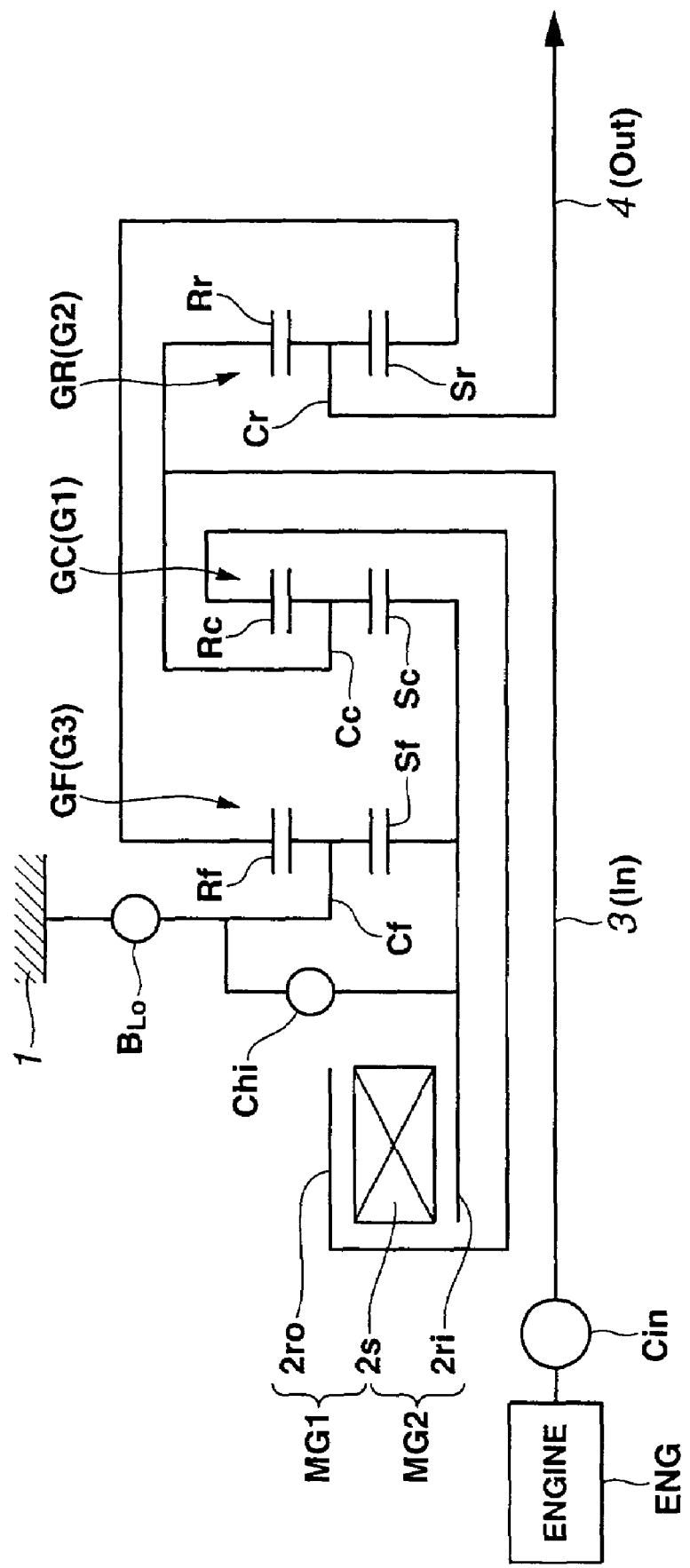
FIG. 15 is a coupling-and-block diagram of the hybrid transmission in an eighth preferred embodiment according to the present invention.
Figure 16:
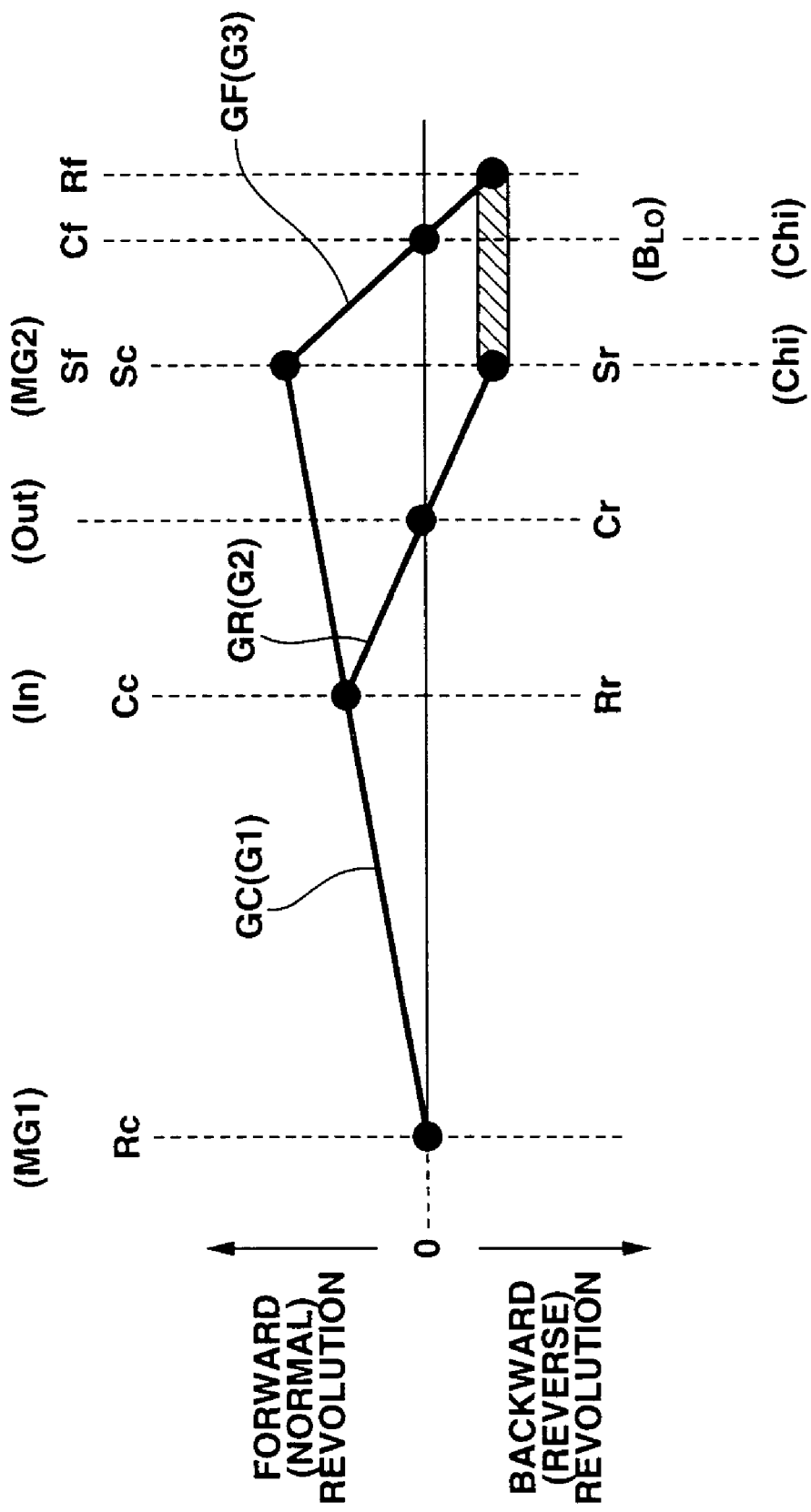
FIG. 16 is a lever diagram of the hybrid transmission shown in FIG. 15.

FIGS. 15 and 16 show an eighth preferred embodiment of the hybrid transmission according to the present invention and its lever diagram. In this embodiment, all of front side planetary gear set GF which is nearest to engine ENG, center planetary gear set GC, and rear side planetary gear set GR which is most remotely located from engine ENG are simple planetary gear sets and constitute third differential unit G3, first differential unit G1, and second differential gear unit G2. These three planetary gear sets are coaxially arranged to engine ENG and are housed in transmission casing 1. Carrier Cc and ring gear Rr are coupled to input axle 3 (as denoted by input portion In within the lever diagram of FIG. 16) at which the revolution of engine ENG is inputted. Carrier Cr is coupled to output axle 4 (as denoted as output portion Out in the lever diagram of FIG. 16). These three planetary gear sets are coaxially arranged with engine ENG and are housed in transmission casing 1. Carrier Cc and ring gear Rr are coupled to input axle 3 at which the revolution of engine ENG is inputted (denoted by an input portion In within the lever diagram of FIG. 16). Carrier Cr is coupled to output axle 4 (as denoted by output portion (Out) in the lever diagram of FIG. 16). First motor/generator MG1 (outer rotor 2ro) is coupled to ring gear Rc and second motor/generator MG2 (inner rotor 2ri) is coupled to sun gear Sf. This sun gear Sf is connected to sun gear Sc. High-clutch Chi serves to couple carrier Cf to sun gear Sf and carrier Cf is fixable to low brake $B_{LO}$. Ring gear Rc and second motor/generator MG2 (inner rotor 2ri) is coupled to sun gear Sf. This sun gear Sf is connected to sun gear Sc. High-clutch Chi serves to couple carrier Cf to sun gear Sf and carrier Cf is fixable to low brake $B_{LO}$. Ring gear Rf is coupled to sun gear Sr. The lever diagram of hybrid transmission in the eighth embodiment is shown in FIG. 16. The revolution speed order of the elements in center planetary gear Gc constituting first differential unit G1 is as follows: ring gear Rc, carrier Cc, and sun gear Sc. The revolution speed order of the elements is rear-side planetary gear set GR constituting second differential unit G2 is as follows: ring gear Rr, carrier Cr, and sun gear Sr. Carrier Cc which is the middle of the revolution speed order in middle planetary gear set GC is mutually linked to ring gear Rr which is the first fastest of the revolution speed order in rear side planetary gear set GR. Sun gear Sr which is the third fastest in the revolution speed order of rear side planetary gear set GR is coupled to sun gear Sc which is the third speed order are respectively coupled to ring gear Rf and sun gear Sf in front side planetary gear set GF constituting three differential gear unit G3, respectively.

Low brake $B_{LO}$ used to fix carrier Cf in front side planetary gear set GF is installed and high-clutch Chi is installed which mutually couples carrier Cf and sun gear Sr of front side planetary gear set GF. The first motor/generator MG1 is coupled to ring gear Rc of center planetary gear Rc. Carrier Cc of center planetary gear set GC is coupled to input portion In from engine ENG. Output portion Out to the vehicular drive system is coupled to carrier Cr of rear side planetary gear set GR, and the second motor/generator MG2 is coupled to sun gear Sf of front side planetary gear set CF.

The lever diagram of the hybrid transmission in the eighth preferred embodiment is shown in FIG. 16. The lever diagram shown in FIG. 16 is the same arrangement as already shown in the lever diagram of each of the first through seventh embodiments (FIGS. 2, 4, 6, 8, 10, 12, and 14). Thus, by the suitable use between the first gear ratio mode in which the clutching of high-clutch Chi causes carrier Cf and sun gear Sf to be coupled together and the second gear ratio mode in which low brake $B_{LO}$ is operated to fix carrier Cf, in other words, since the second gear ratio mode is used in the low-side gear ratio region including the reverse gear ratio rather than the revolutions of sun gear Sc (sun gear Sf) and sun gear Sr are zeroed (denoted by a in FIG. 27) and the first gear ratio mode is used in the high-side transmission ratio region, both of first and second motor/generator MG1 and MG2 are not present on the output portion of the transmission in any gear ratio mode. Hence, the passing powers of first and second motor/generators MG1 and MG2 are not increased as described in the first embodiment as described in the first embodiment with reference to FIG. 27. Therefore, the miniaturization of motor/generators can be achieved. The width of the gear ratio at which the large torque can be developed with a high efficiency and at which the engine power is transmissible can be widened.

In addition, in the eighth embodiment, since output side motor/generator MG2 (inner rotor 2ro) which is rotating at high speeds and which is near to output portion Out in the lever diagram of FIG. 16 is coupled to sun gears Sf and Sc whose diameters are small, the large centrifugal force is not developed even if these sun gears have revolved at high speeds and it is advantageous in terms of durability.

Since all of planetary gear sets GF, GR, and GC constituting first, second, and third differential units G1, G2, and G3 are constituted by inexpensive simple planetary gear sets, it is advantageous in terms of a manufacturing cost. Furthermore, since the multiple axis structure passing through the center portion of compound current double layer motor 2 present between engine ENG and planetary gear sets GF, GR, and GC can be suppressed to the tri-axis structure, the dimension in the radial direction of the hybrid transmission can be avoided from being increased.

(Ninth Embodiment)

Figure 17:
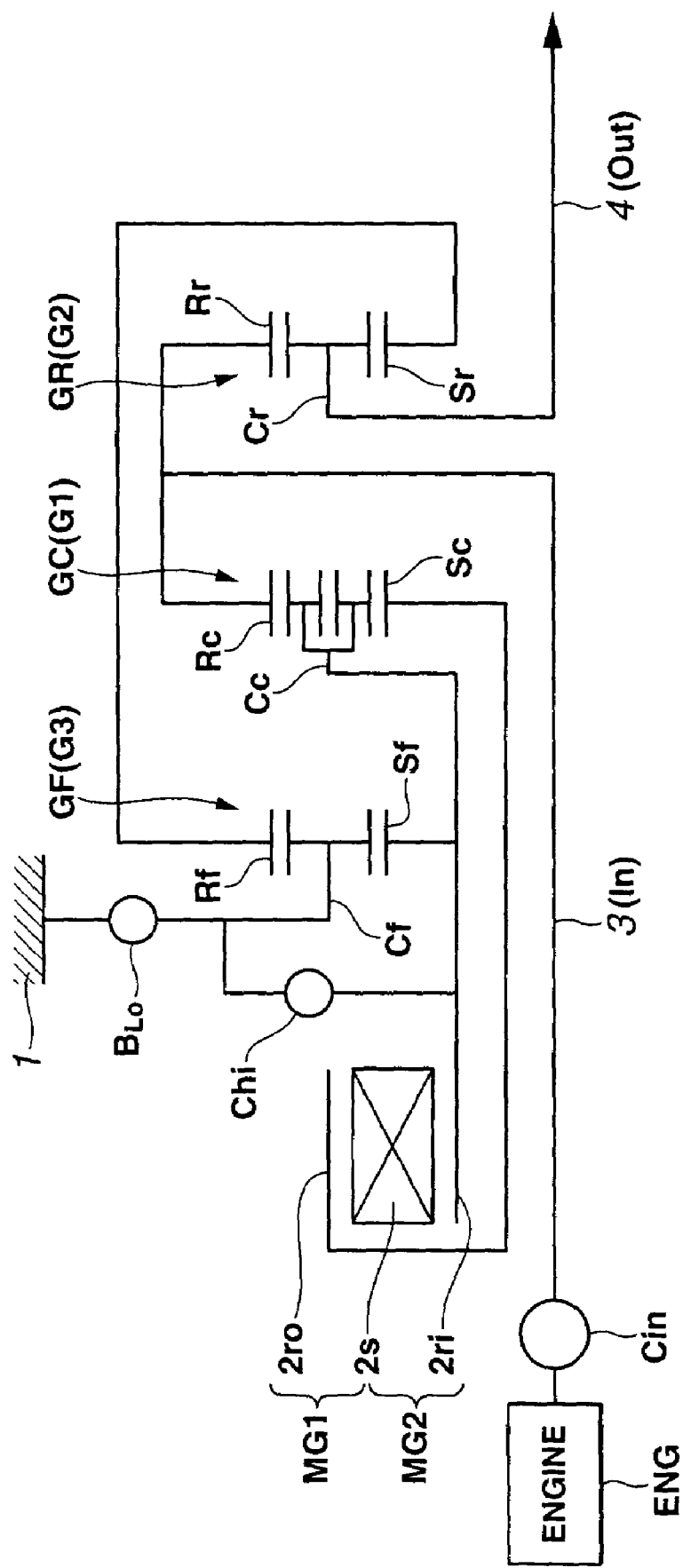
FIG. 17 is a coupling-and-block diagram of the hybrid transmission in a ninth preferred embodiment according to the present invention.
Figure 18:
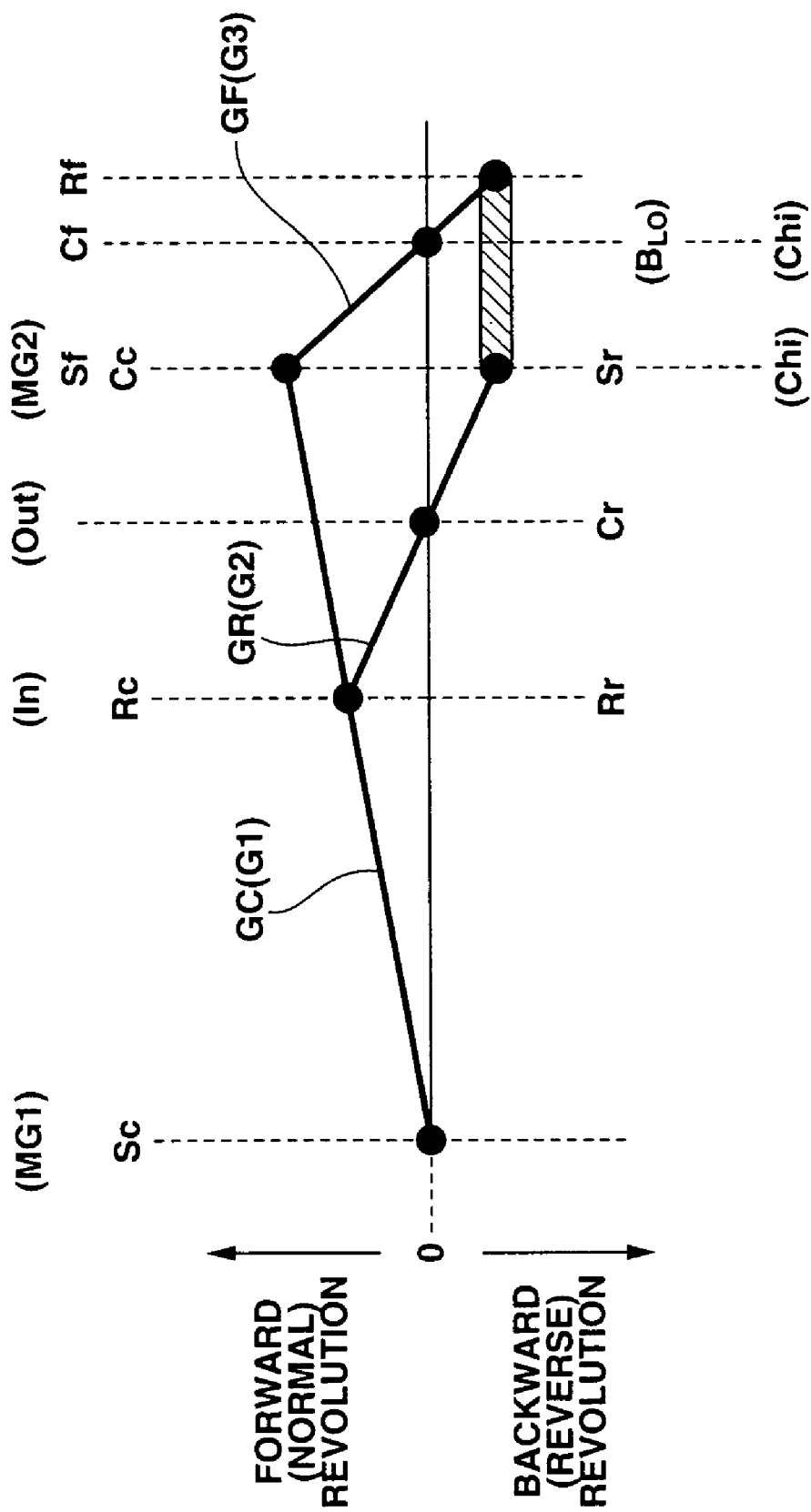
FIG. 18 is a lever diagram of the hybrid transmission shown in FIG. 17.

FIGS. 17 and 18 show a ninth preferred embodiment of the hybrid transmission according to the present invention and its lever diagram. In the ninth embodiment, center planetary gear set GC is the double pinion planetary gear set constituting first differential gear unit G1 according to the present invention and front side planetary gear set GF which is near to engine ENG and rear side planetary gear set GR which is remote from engine ENG are simple planetary gear sets constituting third and second differential units G3 and G2 according to the present invention. These three planetary gear sets are coaxially arranged on engine ENG and housed within transmission casing 1. Ring gear Rc and ring gear Rr are coupled to input axle 3 (denoted as input portion In within the lever diagram of FIG. 18) at which the revolution of engine ENG is inputted via dry-type clutch Cin to couple carrier Cr to output axle 4 (as denoted by an output portion Out in the lever diagram of FIG. 18). Sun gear Sc of center planetary gear set GC is coupled to first motor/generator MG1 (outer rotor 2ro) and sun gear Sf is coupled to second motor/generator MG2 (inner rotor 2ri). Sun gear Sf is coupled to carrier Cc. High-clutch Chi is enabled to be coupled to carrier Cf and sun gear Sf. Carrier Cf is fixable by means of low brake $B_{LO}$. Ring gear Rf is coupled to sun gear Sr. The lever diagram of the hybrid transmission is as shown in FIG. 18. The revolution speed order of the elements in center planetary gear set GC constituting first differential unit G1 is as follows: sun gear Sc, ring gear Rc, and carrier Cc. The revolution speed order of the elements in rear side planetary gear set GR constituting second differential gear unit G2 is as follows: ring gear Rr, carrier Cr, and sun gear Sr.

Ring gear Rc which is the middle in the revolution speed order in center planetary gear set GC is mutually coupled to ring gear Rr whose revolution speed order is the first in rear side planetary gear set GR. Sun gear Sr which is the third fastest in the revolution speed order in center planetary gear set GR and carrier Cc which is the third in the revolution speed order in center planetary gear set GC are coupled, respectively, to ring gear Rf at front side planetary gear set GF constituting third differential gear set G3 and sun gear Sf thereof. Low brake $B_{LO}$ is disposed to serve to fix carrier Cf of front side planetary gear set GF and high-clutch Chi is disposed to serve to mutually couple carrier Cf of front side planetary gear set GF and sun gear Sf thereof. First motor/generator MG1 is coupled to sun gear Sc of center planetary gear set GC. Input portion In from engine ENG is coupled to sun gear Sc of center planetary gear GF. High-clutch Chi serves to mutually couple carrier Cf and sun gear Sf of front side planetary gear set GF. Output portion Out to the vehicular wheel drive is coupled to carrier Cr of rear side planetary gear set GR and rear sun gear Sf of front side planetary gear set GF is coupled to second motor/generator MG2. The lever diagram of the hybrid transmission described above shown in FIG. 18 is the same as that described in each of the first through eighth embodiments (FIGS. 2, 4, 6, 8, 10, 12, 14, and 16). Thus, for the proper use of the fist gear ratio mode in which the clutching of high-clutch Chi causes carrier Cf and sun gear Sf to be coupled together and of the second gear ratio mode in which carrier Cf is fixed when low brake $B_{LO}$ is operated, in other words, since the second gear ratio mode is used in low-side gear ratio region including the reverse gear ratio rather than the gear ratio (as denoted by a in FIG. 27) at which the revolutions of carrier Cc (sun gear Sf) and sun gear Sr are zeroed and the first gear ratio mode is used in the high-side transmission ratio region, in any of the gear ratio modes, first and second motor/generators MG1 and MG2 are not present on the output portion of the transmission. Hence, the passing powers of first and second motor/generators are not increased as described in the first embodiment with reference to FIG. 27. The large torque can be developed with high efficiency. Then, the width of transmission gear ratio at which the engine power is transmissible can be widened. In addition, in the ninth embodiment, output side motor/generator MG2 (inner rotor 2ro) which revolves at high speeds and which are near to output portion (Out) in the lever diagram of FIG. 18 is coupled to sun gear Sf and carrier Cc whose diameters are small. Hence, even if these sun gears Sf and carrier Cc are revolved at high speed, a large centrifugal force can be developed to the degree of ring gear. This is advantageous in terms of durability. Furthermore, since the multiple axis structure passing through the center portion of the compound current double layer motor 2 can be suppressed to be the tri-axis structure, the dimension along the radial direction of the hybrid vehicle can be avoided from being increased.

(Tenth Embodiment)

Figure 19:
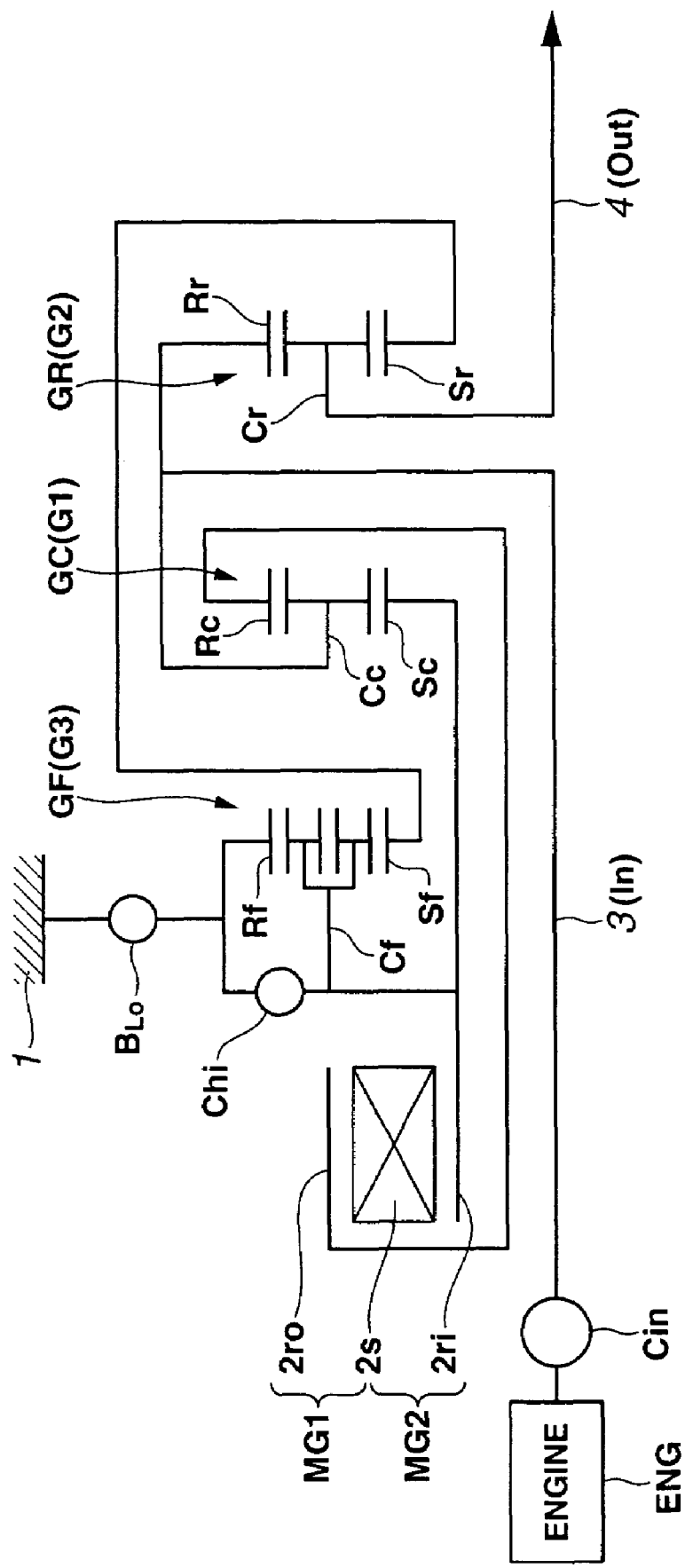
FIG. 19 is a coupling-and-block diagram of the hybrid transmission in a tenth preferred embodiment according to the present invention.
Figure 20:
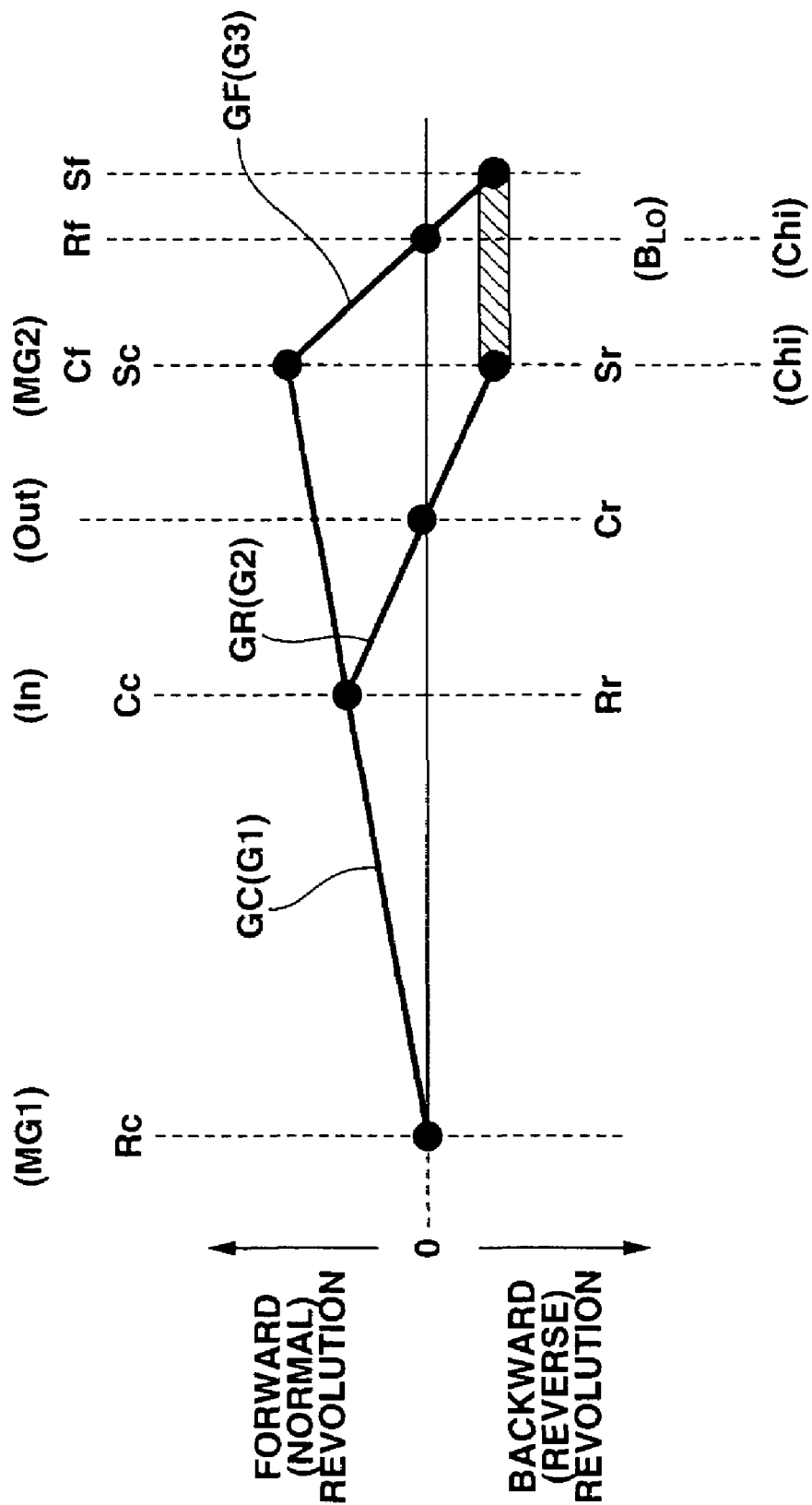
FIG. 20 is a lever diagram of the hybrid transmission shown in FIG. 19.

FIG. 19 and FIG. 20 show a tenth preferred embodiment of the hybrid transmission according to the present invention and its lever diagram. In the tenth embodiment, front side planetary gear set GF which is near to engine ENG is the double pinion gear set constituting third differential unit G3 according to the present invention, center planetary gear set GC and rear side planetary gear set GR which is most remotely located from engine ENG are simple planetary gear sets constituting first planetary gear unit G1 and second planetary gear unit G2 according to the present invention. These three planetary gear sets are coaxially arranged with engine ENG and are housed within casing 1. Carrier Cc and ring gear Rr is coupled to input axle 3 (denoted by input portion In of the lever diagram of FIG. 20) at which the revolution of engine ENG is inputted. Carrier Cr is coupled to output axle 4 (denoted by output portion Out in the lever diagram of FIG. 20). Ring gear Rc is coupled to first motor/generator MG1 (outer rotor 2ro) and carrier Cf is coupled to second motor/generator MG2. Carrier Cf is coupled to sun gear Sc. High-clutch Chi is enabled to be coupled between carrier Cf and ring gear Rf. This ring gear Rf is enabled to be fixed by means of low brake $B_{LO}$. Sun gear Sf is coupled to sun gear Sr. First motor/generator MG1 (outer rotor (2ro)) is coupled to ring gear Rc. Second motor/generator MG2 (inner rotor 2ri) is coupled to carrier Cf. Carrier Cf is coupled to sun gear Sc. High-clutch Chi enables carrier Cf to be coupled to ring gear Rf. This ring gear Rf is enabled to fix by means of low brake $B_{LO}$. Sun gear Sf is coupled to sun gear Sr. The lever diagram of the hybrid transmission in the tenth embodiment is shown in FIG. 20. The revolution speed order of the elements in center planetary gear GC constituting first differential unit G1 is as follows: ring gear Rc, carrier Cc, and sun gear Sc. The revolution speed order of the elements in rear side planetary gear set GR constituting second differential unit G2 is as follows: ring gear Rr, carrier Cr, and sun gear Sr. carrier Cc which is the middle in the revolution speed order in the middle planetary gear set GC is mutually coupled to ring gear Rr which is the first fastest in the revolution speed order in rear side planetary gear set GR. Sun gear Sr which is the third fastest in the revolution speed order in rear side planetary gear set GR and sun gear Sc which is the third fastest in the revolution speed order in center planetary gear set GR are respectively coupled to sun gear Sf and carrier Cf in the front side planetary gear set GF constituting third differential unit G3. In addition, low brake $B_{LO}$ is disposed to serve to fix ring gear Rf in front side planetary gear set GF and high-clutch Chi which serves to mutually couple ring gear Rf of front side planetary gear set GF to input portion In from engine ENG. Carrier Cr of rear side planetary gear set GR is coupled to output portion Out to the vehicular road wheel drive system. Second motor/generator MG2 is coupled to carrier Cf of front side planetary gear set GR.

The lever diagram of the above-described hybrid transmission shown in FIG. 20 is the same as that described in each of the previously described first through ninth embodiment of the hybrid transmission (FIGS. 2, 4, 6, 8, 10, 12, 14, 16, and 18).

In the tenth embodiment, for the proper use of the clutching of high-clutch Chi to couple ring gear Rf and carrier Cf and the operation of low brake $B_{LO}$ causes carrier Cf to be fixed, in order words, the second gear ratio mode is used in the low side transmission gear ratio region including reverse gear ratio rather than the gear ratio (as denoted by a in FIG. 27) at which the revolution of sun gear Sc (carrier Cf) and sun gear Sr are zeroed and the final gear ratio mode is used in the high-side gear ratio region. Hence, in any gear ratio mode, first and second motor/generators MG1 and MG2 are not present on the output portion of first and second motor/generators MG1 and MG2. Thus, as described in the first embodiment with reference to FIG. 27, the passing power through first and second motor/generators MG1 and MG2 is not increased. Consequently, the miniaturization of the motor/generators can be achieved. The large torque can be developed with the high efficiency. The width of the gear ratio by which the engine power can be transmitted can be achieved. In addition, in the tenth embodiment, output side motor/generator MG2 (inner rotor $2ri$) is coupled to small-diameter carrier Cf and sun gear Sc, such a large centrifugal force as the ring gear is not large. It is advantageous in terms of durability. Furthermore, since the multiple axis structure passing through the center portion of compound current double layer motor 2 present between engine ENG and planetary gear sets GF, GR, and GC can be suppressed to be the tri-axis structure, an excessively large radial size of the hybrid transmission can be avoided. Since the double pinion planetary gear set constitutes front side planetary gear set GF of third differential unit, the width of the low-side transmission gear ratio can be widened. Accordingly, the gear ratio is increased and miniaturization of motor/generator MG1 and MG2 can be achieved.

(Eleventh Embodiment)

Figure 21:
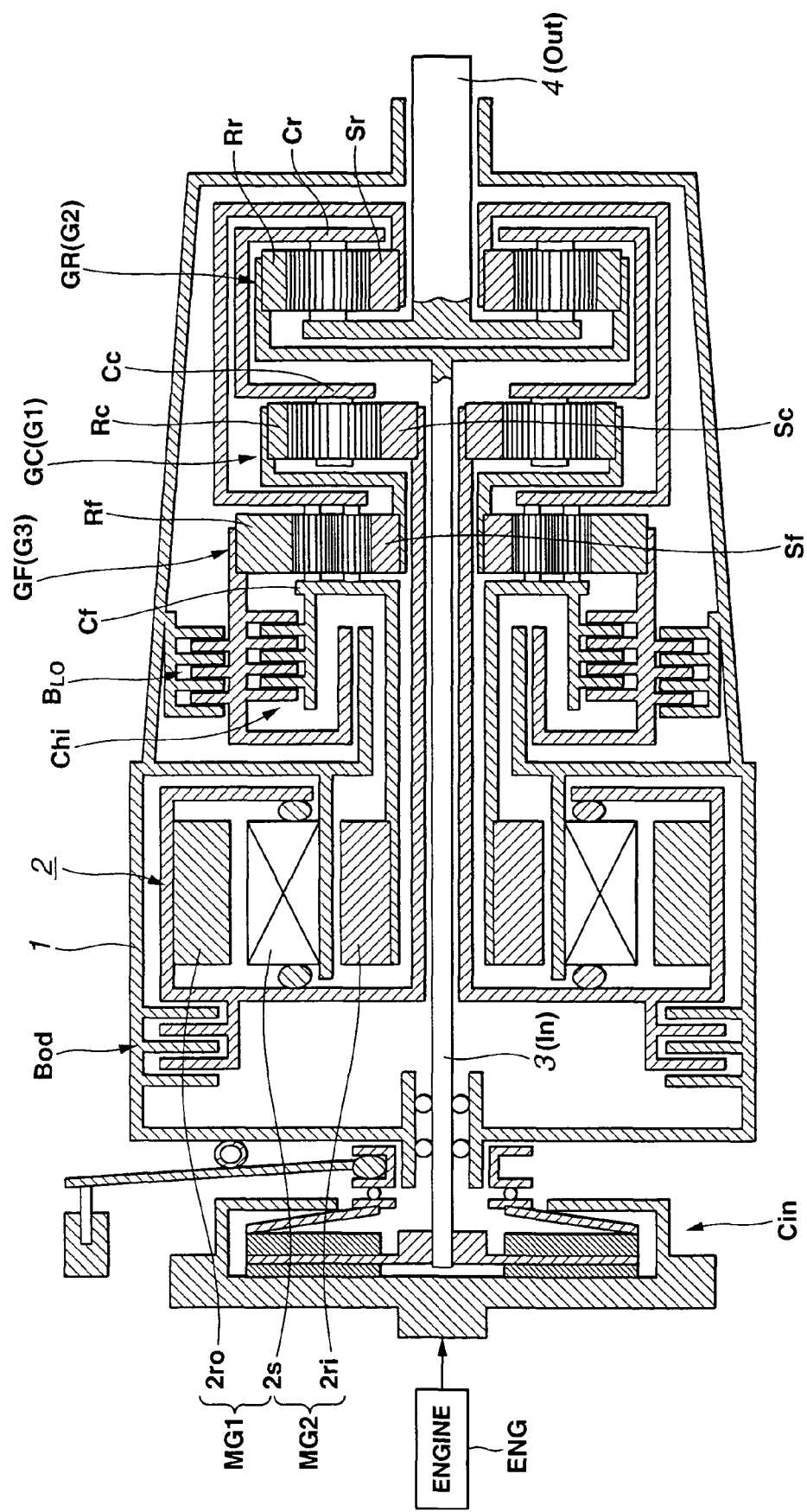
FIG. 21 is a longitudinally cross sectioned side view of the hybrid transmission in an eleventh preferred embodiment according to the present invention.
Figure 22:
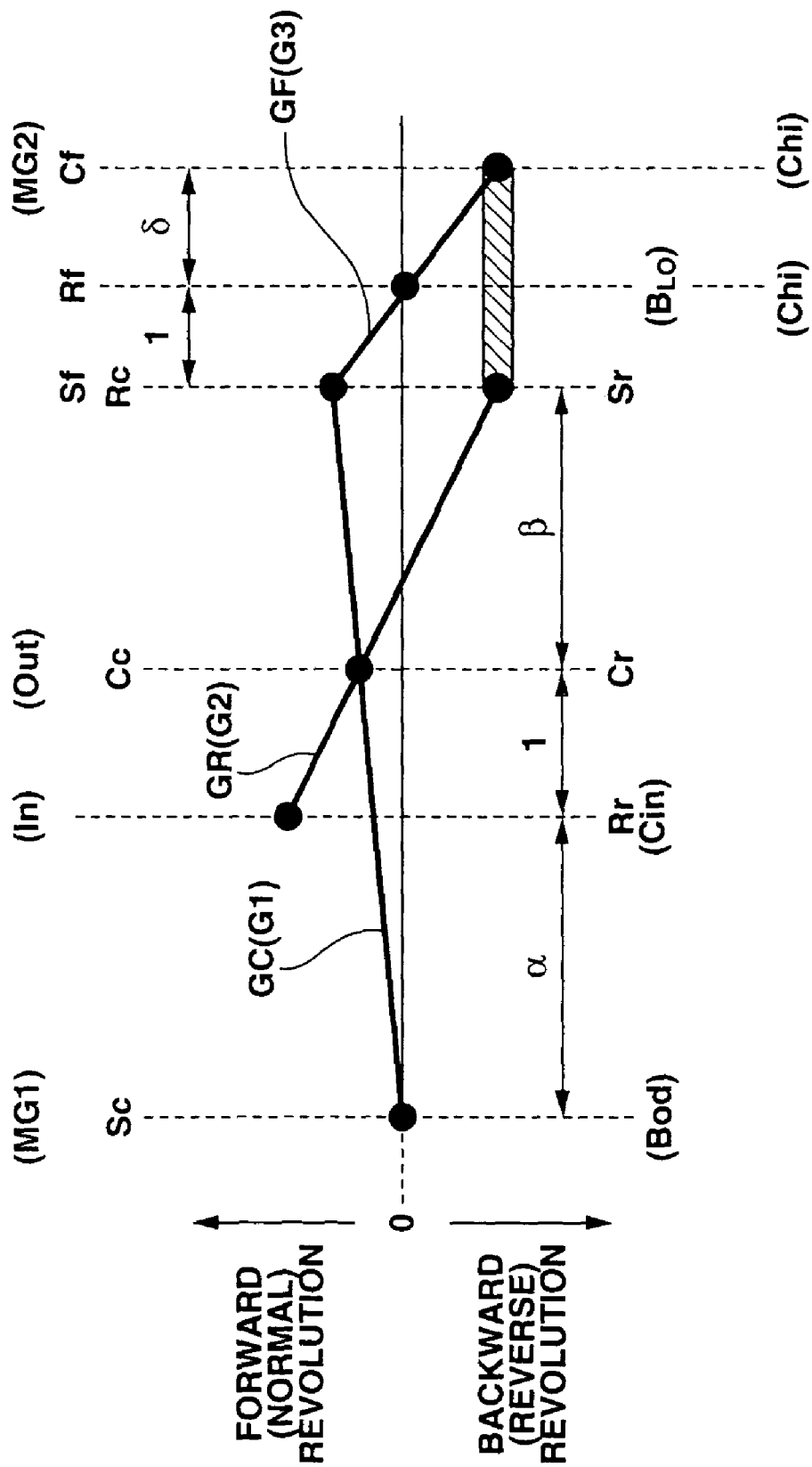
FIG. 22 is a lever diagram of the hybrid transmission shown in FIG. 21.

FIGS. 21 and 22 show an eleventh preferred embodiment of the hybrid transmission according to the present invention. In the eleventh embodiment, front side planetary gear set GF is the double pinion planetary gear set which is nearest to engine ENG constituting third differential unit G3 according to the present invention and center and rear side planetary gear sets GC and GR are simple planetary gear sets constituting first and second differential units G1 and G2. These three planetary gear sets are coaxially disposed on the engine ENG and housed in transmission casing 1. However, ring gear Rr is coupled to input axle 3 at which the revolution of engine ENG is inputted via dry-type clutch Cin (as denoted by input portion In within the lever diagram of FIG. 22) and carrier Cr is coupled to output axle 4 (as denoted by output portion Out in the lever diagram of FIG. 22).

Sun gear Sc is coupled to first motor/generator MG1 (outer rotor $2ro$) and sun gear Sc is enabled to be fixed to over drive brake Bod. Second motor/generator MG2 (inner rotor $2ri$) is coupled to carrier Cf and this carrier Cf is coupled to ring gear Rr. High-clutch Chi is enabled to be coupled to carrier Cf and ring gear Rf. Ring carrier Rf is enabled to be fixed by means of low brake $B_{LO}$. Sun gear Sf is coupled to ring gear Rc.

The lever diagram of the hybrid transmission in the eleventh embodiment is shown in FIG. 22. Carrier Cc which is the middle of the revolution speed order in center planetary gear set GC is mutually coupled to sun gear Sr which is the third fastest of the revolution speed order in rear side planetary gear set GR. Sun gear Sr which is the third fastest in the revolution speed order in rear side planetary gear set GR and ring gear Rc which is the third fastest in the revolution speed order in rear side planetary gear set GR are respectively coupled to carrier Cf and sun gear GF constituting third differential unit G3. In addition, ring gear Rf of front side planetary gear set GF is enabled to be fixed by means of low brake $B_{LO}$. High-clutch Chi is connectable between carrier Cf of planetary gear couple GF and ring gear Rf. First motor/generator MG1 (outer rotor $2ro$) is coupled to sun gear Sc of center planetary gear set GC. Input portion In from engine ENG is coupled to ring gear Rr of rear side planetary gear set GR. Carrier Cr of mutually coupled rear side planetary gear set GR and carrier Cc of center planetary gear set are coupled to output portion Out to the vehicular road wheel drive system. Motor/generator MG2 (inner rotor $2ri$) is coupled to carrier Cf of front side planetary gear set GF. In addition, ring gear Rf of front side planetary gear GF is fixable by means of low brake $B_{LO}$. High-clutch Chi enables the coupling between carrier Cf of front side planetary gear and ring gear Rf thereof. First motor/generator MG1 (outer rotor $2ro$) is coupled to sun gear Sc of center planetary gear Sc. Input portion In from engine ENG is coupled to ring gear Rf of rear side planetary gear set GR and carrier Cc of center planetary gear set GC. Second motor/generator MG2 (inner rotor $2ri$) is coupled to carrier Cf of front side planetary gear GF. It is noted that, in the hybrid transmission represented in the lever diagram shown in FIG. 22, the clutching of high-clutch Chi causes carrier Cf and ring gear Rf of front side planetary gear set GF to be coupled together. At this time, all revolution elements of front side planetary gear set GF are integrally rotated. Hence, on the lever diagram of FIG. 22, sun gear Sr is made coincident with ring gear Rc (sun gear Sf). In this case, a lever GR (G2) in FIG. 22 rides on a lever GC(G1) and a gear train constituted by planetary gear sets GC and GR provides a gear ratio state represented by a straight line of a four-element, two-degrees of freedom illustrated by lever GC(G1) of FIG. 22. The revolution speed order of revolvable elements is as follows: first motor/generator MG1, input portion In from engine ENG, an output portion Out to vehicular wheel drive system, and second motor/generator MG2. In the first generator mode in which high-clutch Chi is clutched, while second motor/generator MG2 is in the backward (reverse) revolution state, first motor/generator MG1 is driven as the motor. On the contrary, while second motor/generator MG2 is revolved in the forward (normal) revolution state, second motor/generator MG2 is driven while power generating at first motor/generator MG1. Thus, an income-and-outgo of the electric power is balanced. In this state, the vehicle can be driven. Furthermore, when one of the motor/generators MG1 and MG2 which is in the motor drive state is set to be a small output power and the other motor/generator at which the power generation is carried out and whose generation power is made large, it is possible to make a chargeable state.

It is noted that since overdrive brake Bod is operated and ring gear Rf is fixed, as illustrated by lever GF(G1) in FIG. 12, a fixed overdrive gear ratio such that the revolution speed of input portion In is higher than revolution speed of output portion Out can be achieved. At this time, a driving force assistance and an energy regeneration by means of second another/generator MG2 are made possible. A reduction of engine fuel consumption can be achieved. In addition, under the region of low driving force, the backward (reverse) run, a gear ratio infinity (vehicle stop state), and a large speed-reduction ratio can be achieved under engine ENG drive state and EV run state.

Next, by the operation of low brake $B_{LO}$ in place of high-clutch Chi, the shift operation with ring gear Rf fixed will be described. In the second gear ratio mode in which low brake $B_{LO}$ is operated, the reduction of sun gear Sr with respect to ring gear Rc (sun gear Rf) as shown by the lever GF(G3) of FIG. 22 provides an opposite revolution determined according to the ratio of teeth number between ring gear Rf and sun gear Sf. Hence, output portion Out coupled to carrier Cr and Cc is lower than that during the first gear ratio mode described above. Hence, the second gear ratio mode is used in the region of low side gear ratio including the reverse gear ratio rather than the gear ratio at which the revolution speeds of ring gear Rc (sun gear Sf) and sun gear Sr are zeroed. If revolutions of input portion In is constant, second motor/generator MG2 lowers the reverse revolution to reduce the normal revolution of ring gear Rc, the reverse revolution of carrier Cf being reduced to reduce the positive (normal) revolution of ring gear Rc so that output portion Out revolution coupled to carrier Cc is reduced. The gear ratio can be transferred to low side. Furthermore, it is possible to transfer from the gear ratio of low-side infinity (stop) to the reverse ratio. If the revolutions of ring gear Rf crosses zero revolutions and, at this time, the power income-and-outgo is balanced and the vehicle is driven, the passing power of both motor/generators MG1 and MG2 is the same as output when the infinite gear ratio occurs. At the other gear transmission ratio, passing powers of motor/generators MG1 and MG2 are zeroed. In the second gear ratio mode, if the number of teeth of ring gears and sun gears ($\alpha$, $\beta$, and $\delta$ in FIG. 22) in planetary gear sets GF, GC, and GR are appropriately selected, the passing powers of both motor/generators MG1 and MG2 can be smaller than those in the first gear ratio mode, the highly efficient and large driving torque can be achieved by the small sized motor/generators MG1 and MG2 can be realized. In the eleventh embodiment, the proper use of the first gear ratio mode in which carrier Cf and ring gear Rf are coupled and of the second gear ratio mode in which the operation of low brake $B_{LO}$ causes ring gear Rf to be fixed, in other words, the second gear ratio mode is used in the low-side gear ratio region including the backward (reverse) gear ratio rather than the gear ratio (as denoted by a in FIG. 27) at which the revolutions of ring gear Rc (sun gear Sr) and sun gear Sr are zeroed and the first gear ratio mode is used in the high-side gear ratio region. Hence, in any of the gear ratio modes, both of first and second motor/generators MG1 and MG2 are not present on the output portions of transmission. The passing powers through first and second motor/generators MG1 and MG2 are not become increased. Hence, the miniaturization of motor/generators can be realized, the large torque can be developed with high efficiency. The width of gear ratio at which the engine power is not transmissible can be widened.

(Twelfth Embodiment)

Figure 23:
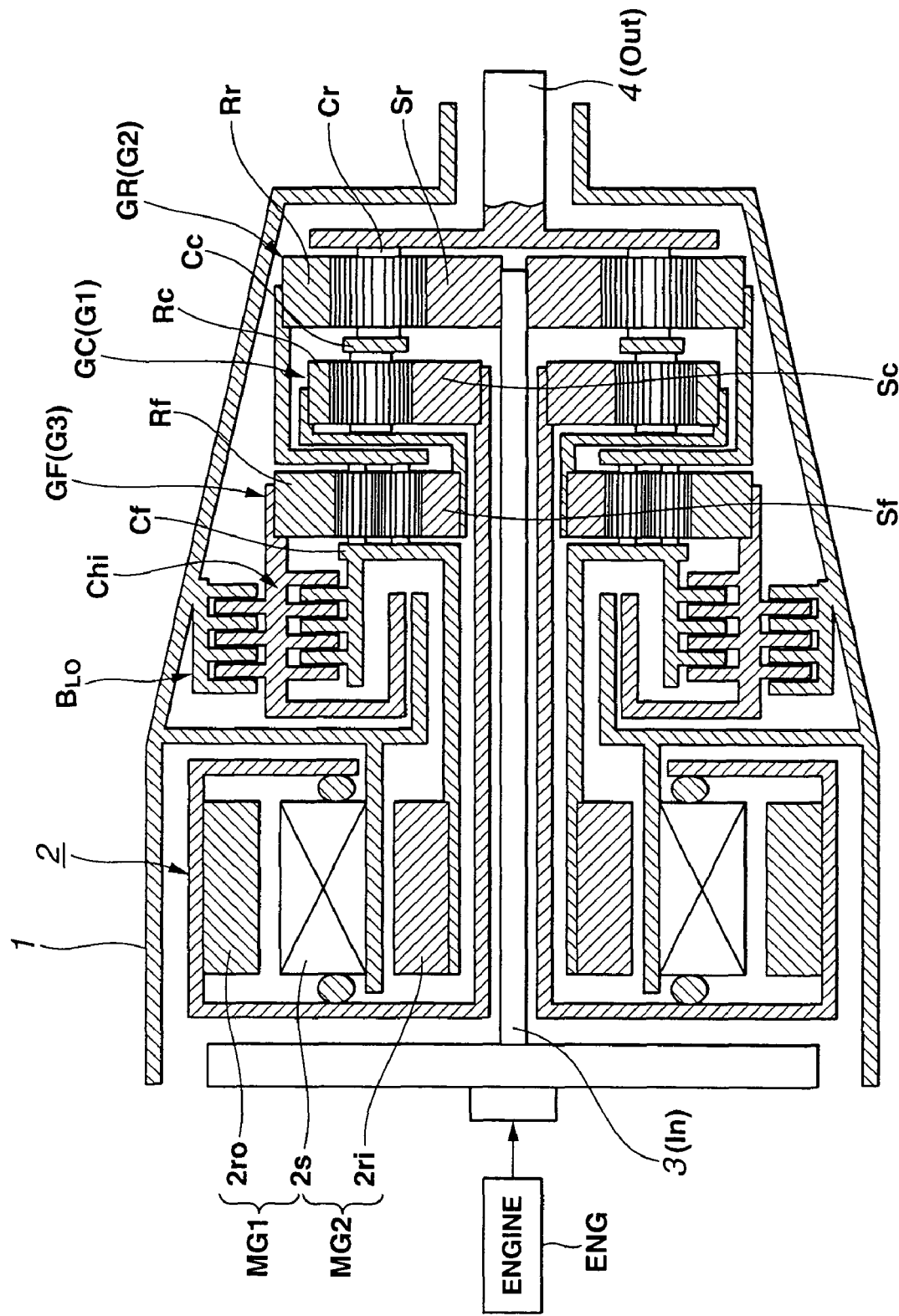
FIG. 23 is a longitudinally cross sectioned side view of the hybrid transmission in a twelfth preferred embodiment according to the present invention.
Figure 24:
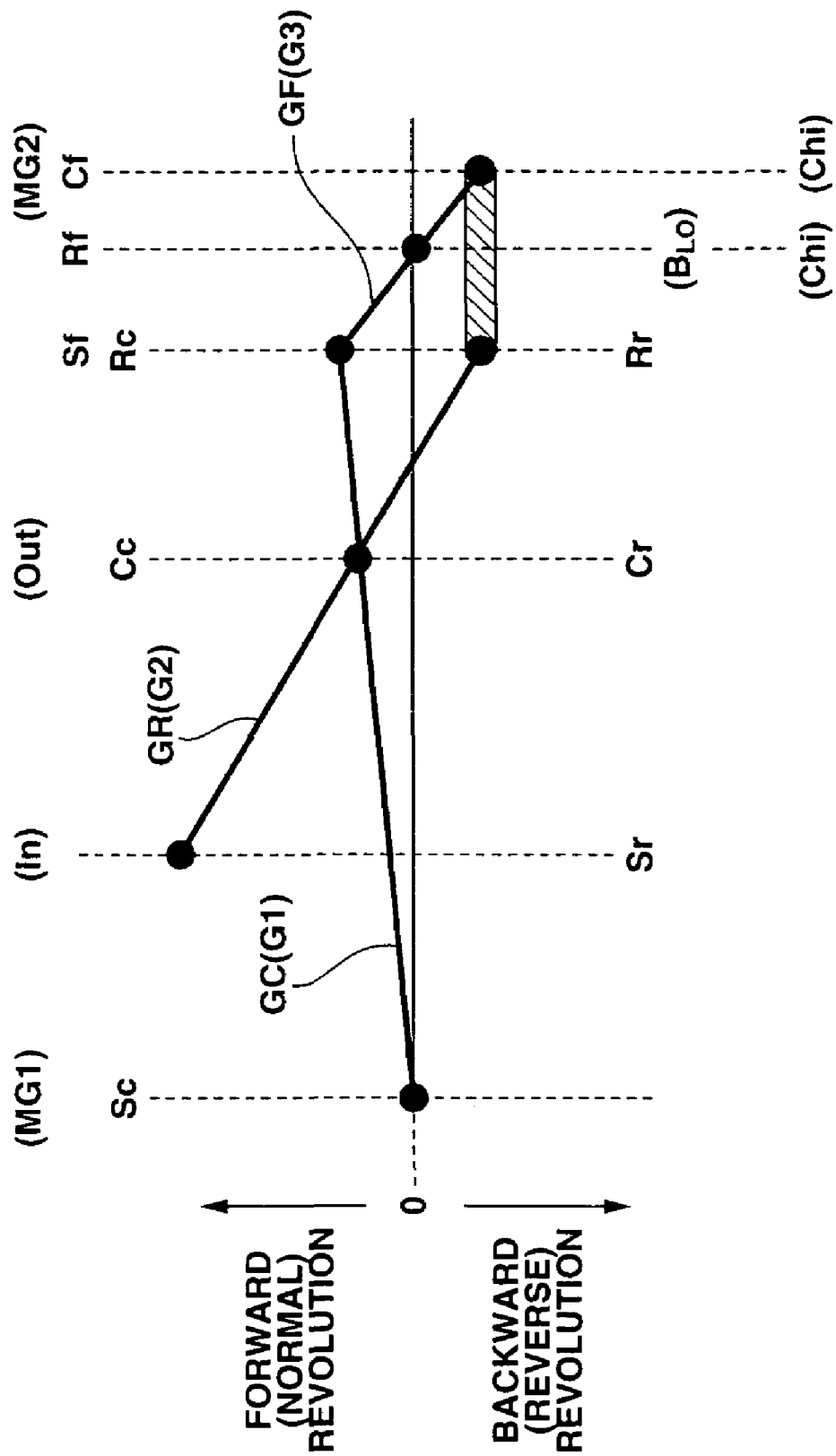
FIG. 24 is a lever diagram of the hybrid transmission shown in FIG. 23.

FIG. 23 shows a hybrid transmission of a twelfth preferred embodiment according to the present invention. FIG. 24 shows the lever diagram of the hybrid transmission shown in FIG. 23. In this embodiment, front side planetary gear set GF which is located nearest to engine ENG in the same way as the previously described eleventh embodiment in FIG. 21 is the double pinion planetary gear constituting third differential unit G3 according to the present invention, center planetary gear set GC and rear side planetary gear set GR are simple planetary gear sets constituting first differential unit G1 and second differential unit G2 according to the present invention, and these three planetary gear sets are arranged coaxially on the engine ENG and housed in transmission casing 1. For input axle 3 at which the revolution of engine ENG is inputted (as denoted by input portion In within the lever diagram of FIG. 24), sun gear Sr is coupled to input portion In. The output axle 4 (output portion Out in the lever diagram of FIG. 24) is coupled to carriers Cr and Cc.

First motor/generator MG1 (outer rotor 2ro) is coupled to sun gear Sc. Second motor/generator MG2 (inner rotor 2ri) is coupled to carrier Cf. This carrier Cf is coupled to ring gear Rr. High-clutch Chi is enabled to be coupled between carrier Cf and ring gear Rf. This ring gear Rf is enabled to be fixed by means of low brake $B_{LO}$. Sun gear Sf is coupled to ring gear Rc.

The hybrid transmission in the twelfth embodiment can be represented in the lever diagram as shown in FIG. 24.

Carrier Cc which is in the middle in the revolution speed order of center planetary gear set GC is mutually coupled to carrier Cr which is the middle in the revolution speed order in rear side planetary gear set GR. Ring gear Rr which is the third fastest in the revolution speed order in rear side planetary gear set GR and ring gear GR. Ring gear Rr which is the third of the revolution speed order in rear side planetary gear set GR and ring gear Rc which is the third of the revolution speed order are coupled to carrier Cf and ring gear Sf in front side planetary gear set GF constituting third differential gear unit G3. In addition, ring gear Rf of planetary gear set GF can be fixed to low brake $B_{LO}$. High-clutch Chi is enabled to be coupled between carrier Cf and ring gear Rf of front side planetary gear GF. Sun gear Sc of center planetary gear set GC is coupled to motor/generator MG1. Input portion In from engine ENG is coupled to sun gear Sr of rear side planetary gear set GR. Output portion Out to the vehicular wheel drive system is coupled to carrier Cr of mutually coupled rear side planetary gear set GR and carrier Cc of center planetary gear set GC. Second motor/generator MG2 is coupled to carrier Cf of front side planetary gear set GF. The hybrid transmission in the twelfth embodiment is represented in the lever diagram of FIG. 24 which is the same as that shown in FIG. 22. According to the proper use of the first gear ratio mode in which the clutching of high-clutch Chi couples carrier Cf and ring gear Rf and the second gear ratio mode in which ring gear Rf is fixed by the operation of low brake $B_{LO}$, in other words, the second gear ratio mode is used in the low side gear ratio region including the reverse transmission ratio rather than the gear ratio (as denoted by a in FIG. 27) at which revolutions of ring gear Rc (sun gear Sf) and ring gear Rr are zeroed and the first gear ratio mode in which high side gear ratio region is used. Thus, in any gear ratio mode, no motor/generators are present on the output portion of the transmission. In addition, the passing powers through motor/generators are not large, as described above in the first embodiment with reference to FIG. 27. Hence, the miniaturization of motor/generators can be realized. The large torque can be developed with high efficiency. The width of gear ratio at which the engine power is transmissible can be widened.

(Thirteenth Embodiment)

Figure 25:
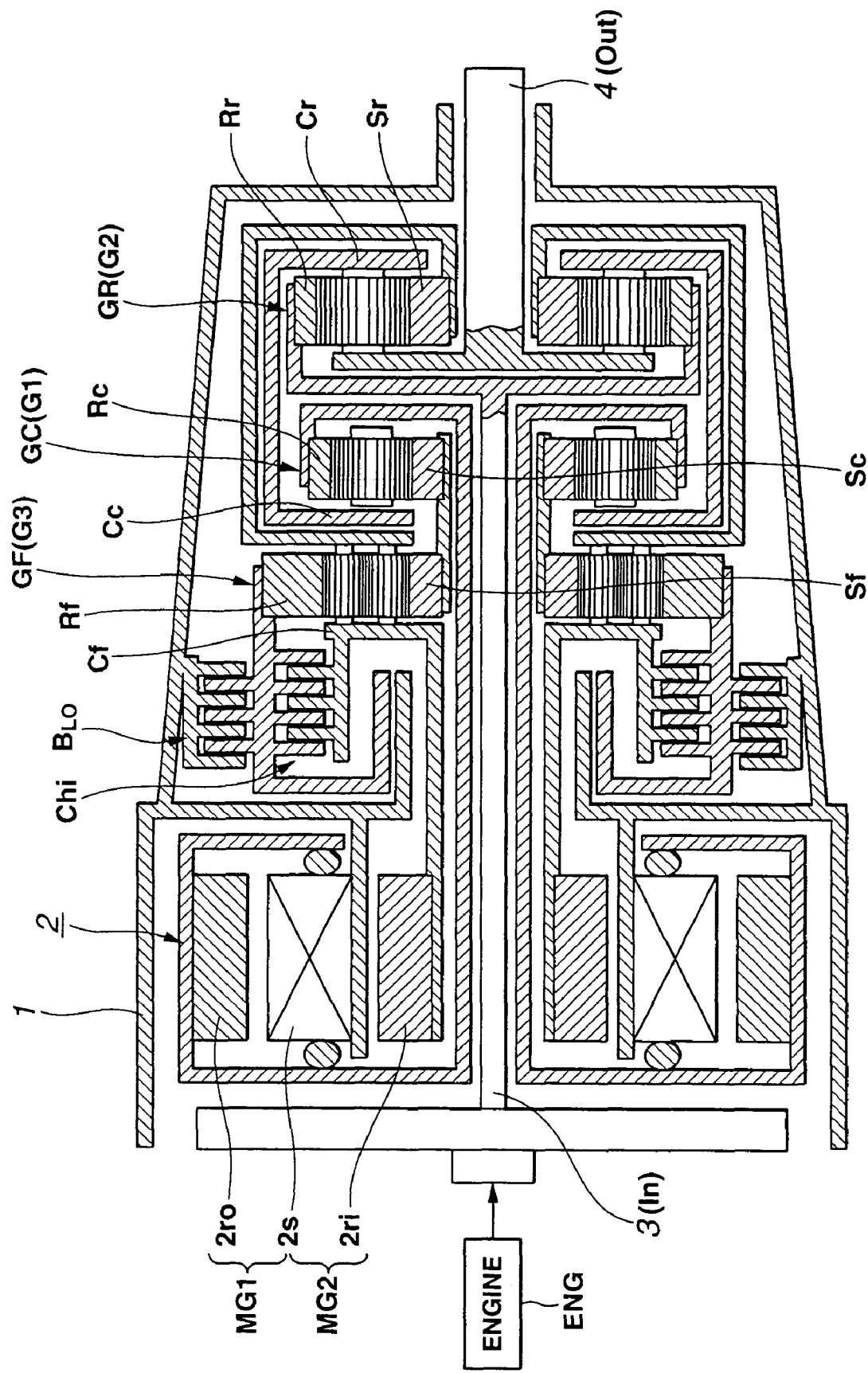
FIG. 25 is a longitudinally cross sectioned side view of the hybrid transmission in a thirteenth preferred embodiment according to the present invention.
Figure 26:
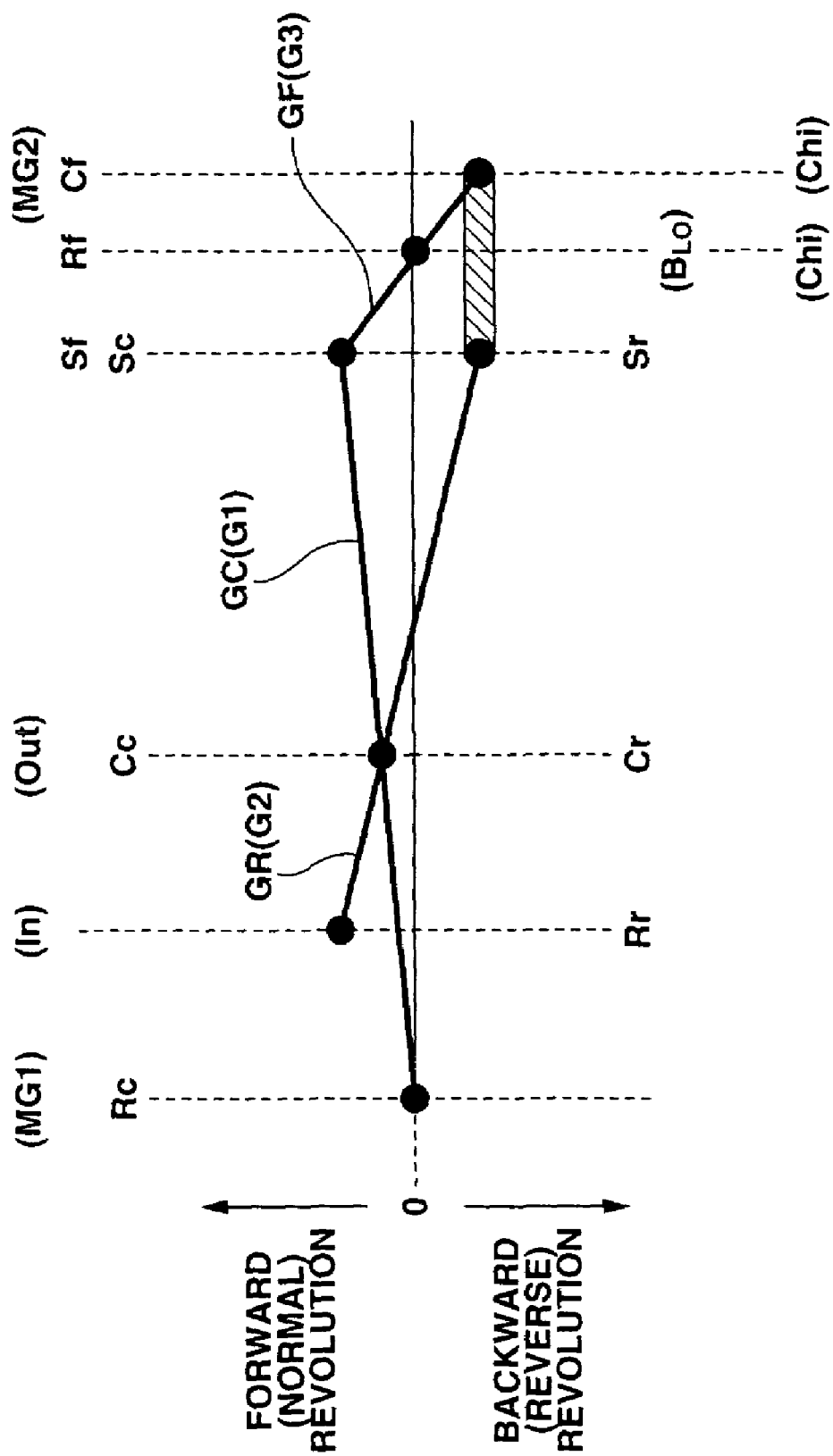
FIG. 26 is a lever diagram of the hybrid transmission shown in FIG. 25.

FIG. 25 shows a thirteenth preferred embodiment of the hybrid transmission and FIG. 26 shows a lever diagram of the hybrid transmission in the thirteenth preferred embodiment shown in FIG. 25. In the thirteenth embodiment, front side planetary gear set GF which is nearest to engine ENG and constitutes the double pinion planetary gear set of third differential unit G3 according to the present invention and center planetary gear set GC and rear side planetary gear set GR constitute simple planetary gear sets of first differential unit G1 and second differential unit G2. These three planetary gear sets are coaxially arranged on engine ENG and housed in transmission casing 1. However, ring gear Rr is coupled to input axle 3 at which the revolution of engine ENG is inputted (as denoted by input portion In within the lever diagram of FIG. 26) and carrier Cr is coupled to output axle 4 (as denoted by output portion Out in the lever diagram of FIG. 26). This carrier Cr is coupled to carrier Cc. Ring gear Rc is coupled to first motor/generator MG1 (outer rotor 2ro). Carrier Cf is coupled to second motor/generator MG2

(inner rotor 2ri). This carrier Cf is coupled to sun gear Sr. High-clutch Cf serves to enable ring gear Rf to be coupled to carrier Cf. This ring gear Rf is enabled to be fixed by means of low brake $B_{LO}$. Sun gear Sf is coupled to sun gear Sc.

The hybrid transmission described above is represented in the lever diagram shown in FIG. 26. Carrier Cc whose revolution speed order in center planetary gear set is the middle is mutually coupled to carrier Cr whose revolution speed order in the rear side planetary gear set GR is the middle in the rear side planetary gear set GR. Sun gear Sr whose revolution speed order in rear side planetary gear set GR is the third and sun gear Sc whose revolution speed order in center planetary gear set GR is the third are coupled to carrier Cf in front side planetary gear set GF constituting third differential unit G3 and sun gear Sf constituting front side planetary gear set GF. In addition, ring gear Rf of front side planetary gear set GF is enabled to be fixed by means of low brake $B_{LO}$. High-clutch Chi is enabled to be coupled between carrier Cf of front side planetary gear set GF and ring gear Rf. Then, ring gear Rc of center planetary gear set GC is coupled to first motor/generator MG1. Input portion In from engine ENG is coupled to ring gear Rr of rear side planetary gear set GR. Output portion Out to the vehicular wheel drive system is coupled to mutually coupled carrier Cr of rear side planetary gear set GR and carrier Cc of center planetary gear set GC. Second motor/generator MG2 is coupled to carrier Cf of front side planetary gear set GF.

The hybrid transmission in the thirteenth embodiment is represented in the lever diagram of FIG. 26 which is the same as in FIGS. 22 and 24. The clutching of high-clutch Chi causes carrier Cf and ring gear Rf to be coupled to enter first gear ratio mode. The operation of low brake $B_{LO}$ causes ring gear Rf to be fixed to enter second gear ratio mode. According to the proper use of the first and second gear ratio modes, in other words, the second gear ratio mode is used in the low-side gear ratio region including the reverse gear ratio rather than the gear ratio (as denoted by a in FIG. 27) at which the revolutions of sun gear Sc (sun gear Sf) and sun gear Sr are zeroed and the first gear ratio mode is used in the high side gear ratio region. Thus, in any of the gear ratio modes, no motor/generators MG1 and MG2 are present on the output portion of the transmission. Hence, the passing powers through first and second motor/generators MG1 and MG2 as describe in the first embodiment with reference to FIG. 27. Consequently, the miniaturization of the motor/generators can be achieved. The large torque can be developed with high efficiency. The width of the gear ratio in the hybrid transmission at which the engine power is transmissible can be widened.

Figure 28A:
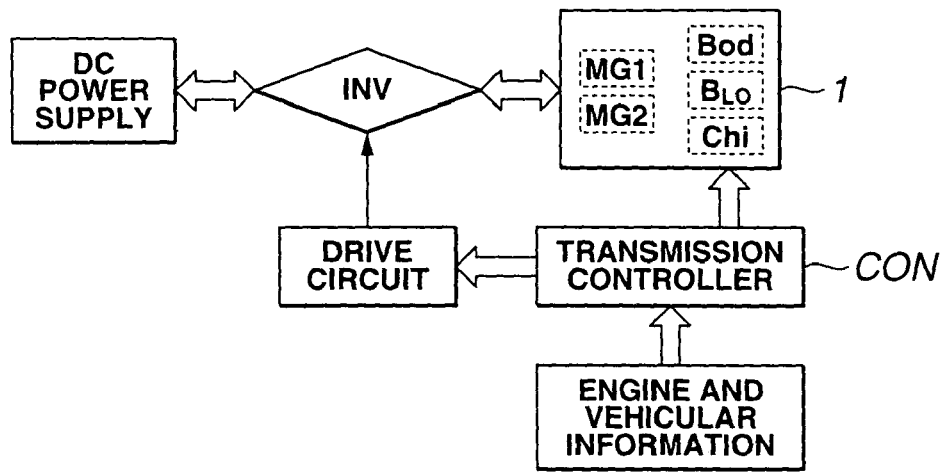
FIGS. 28A and 28B are a circuit block diagram of a peripheral circuit around a transmission controller CON and an operational flowchart representing a control program of a vehicular start executed by the transmission controller shown in FIG. 28A for the vehicle to which the hybrid transmission shown in FIGS. 1 and 2 or shown in FIGS. 21 and 22 is applicable.
Figure 28B:
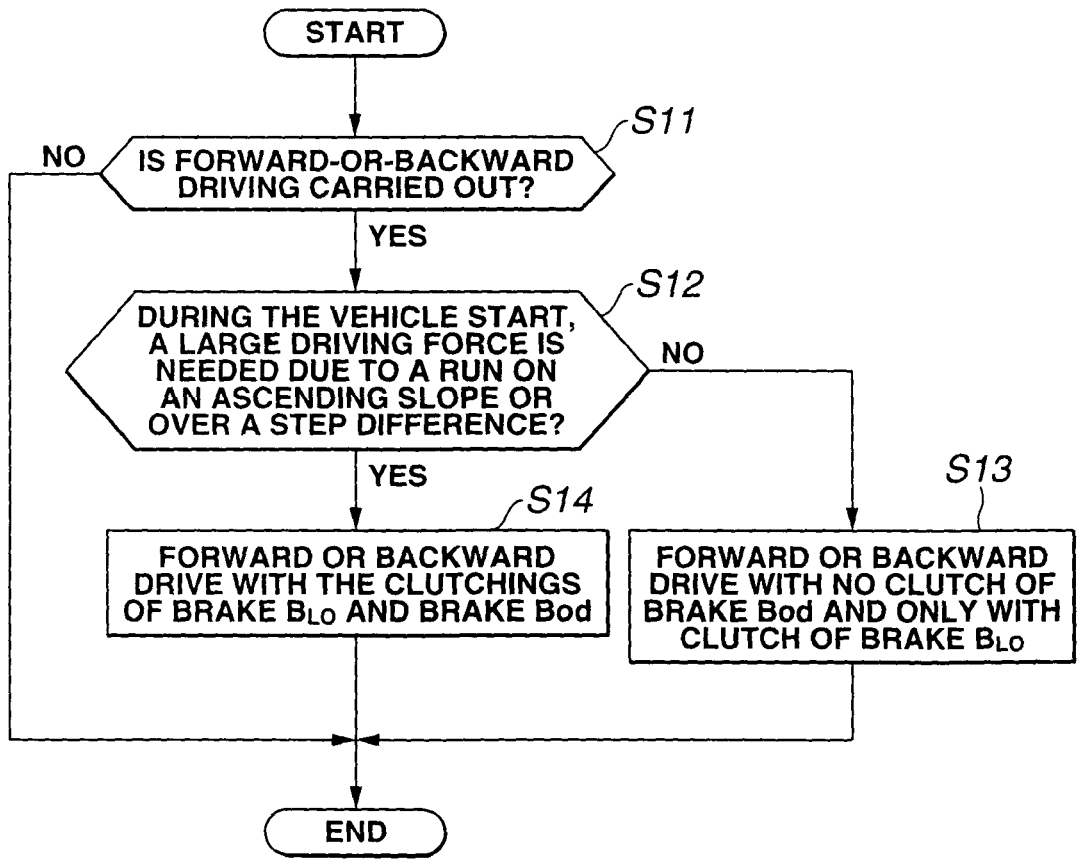

It is noted that, in any embodiment shown in FIGS. 21 through 26, to achieve the action and advantages described above, one of the revolvable elements whose revolution speed order is the middle in the planetary gear set GC constituting first differential unit G1 is mutually coupled to one of the revolvable elements whose revolution speed order is the middle in rear side planetary gear set GR constituting second differential gear unit G2 and front side planetary gear set GF constituting third differential unit G3 serves to shift the revolvable elements whose revolution speed order is the third fastest in rear side planetary gear set GR and one of the revolvable elements whose revolution speed order in center planetary gear set GC is the third fastest are mutually reversed in the reverse directions or revolved in the same direction. Hence, the above-described actions and advantages can be achieved by a simple structure in which front side planetary gear set GF which can coaxially be disposed with respect to center planetary gear set GC and rear side planetary gear set GR is merely added. As described above, when the shift is carried out so that one of the revolvable elements whose revolution speed order is the third fastest in rear side planetary gear set GR is mutually reversed or revolved in the same direction as one of the revolvable elements whose revolution speed order is the third fastest, low brake $B_{LO}$ which serves to fix one of the revolvable elements in front side planetary gear set and high-clutch Chi which couples between two revolvable elements are disposed in the hybrid transmission according to the present invention. The operation of low brake $B_{LO}$ permits a selection of predetermined gear ratio reversed in the opposite direction and the operation of high-clutch Chi permits a selection of predetermined gear ratio in the same direction. Hence, simple operation switching of these high-clutch Chi and low brake $B_{LO}$ permits the above described actions and advantages to be achieved. It is noted that, even if any of the embodiments shown in FIGS. 1 through 26 is used, regardless of whether the vehicle runs in a forward or rearward direction, the vehicle runs in the second gear ratio mode in which low brake $B_{LO}$ is clutched as described above and, with engine ENG stopped and input clutch Cin released, the motor drive of two motor/generators MG1 and MG2 causes the vehicle to make the electric run (EV) with only electrical power. However, the driving force through the electric vehicle run is varied in accordance with vehicle speed VSP (which is proportional to the revolution speed of output portion Out) is illustrated by $\alpha$ in FIG. 29. In a case where the above-described vehicle start is the start on an ascending slope or the start over a step difference, there is a possibility that an insufficiency in driving force occurs in the EV run. To avoid this problem, in the hybrid transmission in which overdrive brake Bod is equipped as shown in FIGS. 1, 2, 21, and 22, a control program in accordance with a flowchart of FIG. 28B is executed by a transmission controller CON shown in FIG. 28A to solve the insufficient driving force problem. It is noted that INV shown in FIG. 28A denotes an inverter.

That is to say, at a step S11, transmission controller CON checks to see if the forward drive or backward drive is carried out on the basis of the gear shift state of the hybrid transmission. If neither forward or backward drive is carried out (No) at step S11, the routine is ended since no countermeasure of the insufficient driving force is needed. If yes at step S11 (either the forward or backward drive is carried out), the routine goes to a step S12. At step S12, transmission controller CON determines whether a larger driving force than that denoted by $\alpha$ in FIG. 29 is needed to run on the ascending slope or run over the step difference during the vehicular start.

If, at a step S13, transmission controller CON determines that the above-described larger driving force is not needed, the gear ratio mode enters the second gear ratio mode in which low brake $B_{LO}$ is clutched and the vehicle runs in the electric run (EV) mode with no overdrive brake Bod clutched and the vehicle runs in the electric run (EV) mode with no overdrive brake Bod clutched. If the larger driving force is needed at step S12 (Yes), the routine goes to a step S14. At step S14, the vehicle gear ratio mode is switched to the second gear ratio mode with low brake $B_{LO}$ clutched and the vehicle makes the EV run with overdrive brake Bod clutched. In this case, since a leftmost end in the lever diagram of FIGS. 2 and 22 is fixed, the driving force is increased from $\alpha$ characteristic of FIG. 29 to $\epsilon$ characteristic of FIG. 29 so that the vehicle can start with the large driving force as demanded and an improvement in a start performance can be achieved. Such a large driving force as described above can be achieved without increase in the capacity of motor/generators MG1 and MG2. Hence, without introduction of a large size of both motor/generators, it is possible to achieve a large-capacity and miniaturized hybrid transmission. The revolution speeds of first and second motor/generators can be suppressed to be as low as possible. Then, the hybrid transmission according to the present invention can have advantageously the durability.

In the first and eleventh embodiments, in each of which overdrive brake Bod is mounted as shown in FIGS. 1 and 2 and FIGS. 21 and 22, when the vehicle is equipped with a one-way clutch equipped hybrid transmission, overdrive brake Bod is operated during the stop of the vehicular run on the ascending slope after the EV (electric vehicle) run so that a hill hold function is provided such as to prevent a natural rearward movement on the ascending slope of the vehicle by means of the one-way clutch together with a clutching hold of low brake $B_{LO}$. Consequently, the start on the ascending slope (up-hill start) can be facilitated.

It is noted that, in FIG. 29, to make a comparison in addition to driving force characteristics $\alpha$ and $\epsilon$, described are driving force characteristic $\beta$ caused by the direct power distribution, driving force characteristic $\gamma$ caused by engine ENG, with low brake $B_{LO}$ and overdrive brake Bod operated, and a maximum driving force characteristic $\delta$ which is an addition of driving force characteristic $\gamma$ caused by engine ENG and that caused by first and second motor/generators MG1 and MG2. It is noted that the input side motor/generator described in the claims corresponds to the first motor/generator MG1 and the output side motor/generator described in the claims corresponds to the second motor/generator MG2.

The entire contents of a Japanese Patent Application No. 2002-258879 (filed in Japan on Sep. 4, 2002) are herein incorporated by reference. The scope of the invention is defined with reference to the following claims.

What is claimed is:

1. A hybrid transmission, comprising:
a gear train that comprises two sets of differential units, each differential unit having two degrees of freedom and three revolvable elements, with one revolvable element of one of the two sets of the differential units coupled to one revolvable element of the other of the two sets of the differential units, wherein the hybrid transmission enables a selection between a first predetermined gear ratio wherein a remaining revolvable element of the one of the two sets of the differential units is revolved with a remaining one revolvable element of the other of the two sets of the differential units mutually in the same direction, and a second predetermined gear ratio wherein the remaining one revolvable element of the one of the two sets of differential units is revolved with the remaining one revolvable element of the other of the two sets of the differential units mutually in reverse directions;
an input side motor/generator;
an output side motor/generator;
an input portion from a prime mover; and
an output portion toward a drive system, the input and output side motor/generators and the input and output portions being coupled to the two sets of the differential units in such a manner that, under the selection of the first predetermined gear ratio, in a revolution speed order, the input side motor/generator, the input portion from the prime mover, the output portion toward the drive system, and the output side motor/generator are coupled to the respective revolvable elements of the two sets of the differential units and the output side motor/generator is coupled to at least one revolvable element which does not take part in a revolution of the output portion in any predetermined gear ratio.

2. A hybrid transmission as claimed in claim 1, wherein the two sets of the differential units are a first differential unit and a second differential unit, one of the revolvable elements of the first differential unit whose revolution speed order therein is a middle is mutually coupled to one of the revolvable elements of the second differential unit whose revolution speed order therein is one end, and a gear shift is carried out in such a manner that one of the revolvable elements of the second differential unit whose revolution speed order therein is the other end and one of the revolvable elements of the first differential unit whose revolution speed order therein is an output side end are mutually revolved in at least one of mutually the same and reverse directions to enable the selection of one of the first and second predetermined gear ratios.

3. A hybrid transmission as claimed in claim 1, wherein the two sets of the differential units are a first differential unit and a second differential unit, one of the revolvable elements of the first differential unit whose revolution speed order therein is a middle is mutually coupled to one of the revolvable elements of the second differential unit whose revolution speed order therein is the middle and a gear shift is carried out in such a manner that one of the revolvable elements of the second differential unit whose revolution speed order therein is one end and one of the revolvable elements of the first differential unit whose revolution speed order therein is an output side end are mutually revolved in at least one of mutually the same and reverse directions to enable the selection of one of the first and second predetermined gear ratios.

4. A hybrid transmission as claimed in claim 1, wherein the hybrid transmission further comprises: a third differential unit having two degrees of freedom and three revolvable elements disposed in addition to the two sets of the differential units; a brake disposed to enable a fixation of one of the revolvable elements of the third differential unit; a clutch disposed to enable a coupling between two revolvable elements of the third differential unit, an operation of the brake causing the selection of the second predetermined gear ratio and an operation of the clutch causing the selection of the first predetermined gear ratio.

5. A hybrid transmission as claimed in claim 1, wherein, while the second predetermined gear ratio is selected, the revolution speed of the output side motor/generator is zeroed at a gear ratio including a reverse gear ratio and lower than that when revolution speeds of a remaining one revolvable element of each of the first and second differential units is zeroed.

6. A hybrid transmission as claimed in claim 4, wherein the first, second, and third differential units are constituted by planetary gear sets, respectively, and are integrated into one and coaxially arranged on the same axle as the prime mover, and both of the input side and output side motor/generators are integrated into one and coaxially arranged on the same axle between the prime mover and the first, second, and third differential units.

7. A hybrid transmission as claimed in claim 4, wherein the first, second, and third differential units are disposed in a predetermined order from a position nearest to the prime mover of the first differential unit, the third differential unit, and the second differential unit and all of the first, second, and third differential units are constituted by simple planetary gear sets, a carrier of the first differential unit being coupled to a ring gear of the second differential unit, a sun gear of the second differential unit and a sun gear of the first differential unit being coupled to a ring gear and a sun gear of the third differential unit, respectively, a brake being disposed to enable a fixation of a carrier of the third differential unit, a clutch being disposed to enable a coupling between any arbitrary two elements of the third differential unit, an operation of the brake causing the selection of the second predetermined gear ratio, an operation of the clutch causing the selection of the first predetermined gear ratio, a ring gear of the first differential unit being coupled to the input side motor/generator, a carrier of the first differential unit being coupled to the input portion from the prime mover, a carrier of the second differential unit being coupled to the output portion toward the drive system, and a sun gear of the first differential unit being coupled to the output side motor/generator.

8. A hybrid transmission as claimed in claim 4, wherein the first, second, and third differential units are disposed in a predetermined order from a position nearest to the prime mover of the first differential unit, the third differential unit, and second differential unit and all of the first, second, and third differential units are constituted by simple planetary gear sets, a carrier of the first differential unit being coupled to a sun gear of the second differential unit, a ring gear of the second differential unit and a ring gear of the first differential unit being coupled to a ring gear and a sun gear of the third differential unit, respectively, a brake being disposed to enable a fixation of a carrier of the third differential unit, a clutch being disposed to enable a coupling between any arbitrary two revolvable elements of the third differential unit, an operation of the brake causing the selection of the second predetermined gear ratio, and an operation of the clutch causing the selection of the first predetermined gear ratio, a sun gear of the first differential unit being coupled to the input side motor/generator, a carrier of the first differential unit being coupled to the input portion from the prime mover, a carrier of the second differential unit being coupled to the output portion toward the drive system, and a ring gear of the first differential unit being coupled to the output side motor/generator.

9. A hybrid transmission as claimed in claim 4, wherein the first, second, and third differential units are disposed in a predetermined order from a position nearest to the prime mover of the first differential unit, the third differential unit, and the second differential unit and all of the first, second, and third differential units are constituted by simple planetary gear sets, a carrier of the first differential unit being coupled to a sun gear of the second differential unit, a ring gear of the second differential unit and a sun gear of the first differential unit being coupled to a ring gear and a sun gear of the third differential unit, respectively, a brake being disposed to enable a fixation of a carrier of the third differential unit, a clutch being disposed to couple arbitrary two revolvable elements of the third differential unit, an operation of the brake causing the selection of the second predetermined gear ratio, an operation of the clutch causing the selection of the first predetermined gear ratio, a ring gear of the first differential unit being coupled to the input side motor/generator, a carrier of the first differential unit being coupled to the input portion from the prime mover, a carrier of the second differential unit being coupled to the output portion toward the drive system, and a sun gear of the first differential unit being coupled to the output side motor/generator.

10. A hybrid transmission as claimed in claim 4, wherein the first, second, and third differential units are disposed in a predetermined order from a position nearest to the prime mover of the third differential unit, the first differential unit, and the second differential unit, the first and second differential units being constituted by simple planetary gear sets, the third differential unit being constituted by a double pinion planetary gear set, a carrier of the first differential unit being coupled to a sun gear of the second differential unit, a ring gear of the second differential unit and a ring gear of the first differential unit being coupled to a carrier and a sun gear of the third differential unit, respectively, a brake being disposed to enable a fixation of a ring gear of the third differential unit, a clutch being disposed to enable a coupling between any arbitrary two revolvable elements of the third differential unit, an operation of the brake causing the selection of the second predetermined gear ratio, an operation of the clutch causing the selection of the first predetermined gear ratio, a sun gear of the first differential unit being coupled to the input side motor/generator, a carrier of the first differential unit being coupled to the input portion from the prime mover, a carrier of the second differential unit being coupled to the output portion toward the drive system, and a carrier of the third differential unit being coupled to the output side motor/generator.

11. A hybrid transmission as claimed in claim 4, wherein the first, second, and third differential units are disposed in a predetermined order from a position nearest to the primer mover of the third differential unit, the first differential unit, and the second differential unit, the first and third differential units being constituted by simple planetary gear sets, the second differential unit being constituted by a double pinion planetary gear set, a carrier of the first differential unit being coupled to a carrier of the second differential unit, a sun gear of the second differential unit and a sun gear of the first differential unit being coupled to a ring gear and a sun gear of the third differential unit, respectively, a brake disposed to enable a fixation of a carrier of the third differential unit, a clutch being disposed to enable a coupling between any arbitrary two revolvable elements of the third differential unit, an operation of the brake causing the selection of the second predetermined gear ratio, an operation of the clutch causing the selection of the second predetermined gear ratio, a ring gear of the first differential unit being coupled to the input side motor/generator, a carrier of the first differential unit being coupled to the input portion from the prime mover, a ring gear of the second differential unit being coupled to the output portion toward the drive system, and a sun gear of the third differential unit being coupled to the output side motor/generator.

12. A hybrid transmission as claimed in claim 4, wherein the first, second, and third differential units are disposed in a predetermined order from a position nearest to the prime mover of the third differential unit, the first differential unit, and the second differential unit, the second and third differential units being constituted by simple planetary gear sets and the first differential unit being constituted by a double pinion planetary gear set, a ring gear of the first differential unit being coupled to a carrier of the second differential unit, a sun gear of the second differential unit and a sun gear of the first differential unit being coupled to a ring gear and a sun gear of the third differential unit, respectively, a brake being disposed to enable a fixation of a carrier of the third differential unit, a clutch being disposed to enable a coupling between any arbitrary two revolvable elements of the third differential unit, an operation of the brake causing the selection of the second predetermined gear ratio, an operation of the clutch causing the selection of the first predetermined gear ratio, a carrier of the first differential unit being coupled to the input side motor/generator, a ring gear of the first differential unit being coupled to the input portion from the prime mover, a ring gear of the second differential unit being coupled to the output portion toward the drive system, and a sun gear of the third differential unit being coupled to the output side motor/generator.

13. A hybrid transmission as claimed in claim 4, wherein the first, second, and third differential units are disposed in a predetermined order from a position nearest to the prime mover of the third differential unit, the first differential unit, and the second differential unit, the first and second differential units being constituted by simple planetary gear sets, the third differential gear set being constituted by a double pinion planetary gear set, a carrier of the first differential unit being mutually coupled to a ring gear of the second differential unit, a sun gear of the second differential unit and a sun gear of the first differential unit being coupled to a carrier and a sun gear of the third differential unit, respectively, a brake being disposed to enable a fixation of a ring gear of the third differential unit, a clutch being disposed to enable a coupling between any arbitrary two revolvable elements of the third differential unit, an operation of the brake causing the selection of the second predetermined gear ratio, an operation of the clutch causing the selection of the first predetermined gear ratio, a ring gear of the first differential unit being coupled to the input side motor/generator, a carrier of the first differential gear unit being coupled to the input portion from the prime mover, a carrier of the second differential unit being coupled to the output portion toward the drive system, and a sun gear of the third differential unit being coupled to the output side motor/generator.

14. A hybrid transmission as claimed in claim 4, wherein the first, second, and third differential units are disposed in a predetermined order from a position nearest to the prime mover of the third differential unit, the first differential unit, and the second differential unit, all of the first, second, and third differential units being constituted by simple planetary gear sets, a carrier of the first differential unit being coupled to a ring gear of the second differential unit, a sun gear of the second differential unit and a sun gear of the first differential unit being coupled to a ring gear and a sun gear of the third differential unit, respectively, a brake being disposed to enable a fixation of a carrier of the third differential unit, a clutch being disposed to enable a coupling between arbitrary two revolvable elements of the third differential unit, an operation of the brake causing the selection of the second predetermined gear ratio, an operation of the clutch causing the selection of the first predetermined gear ratio, a ring gear of the first differential unit being coupled to the input side motor/generator, a carrier of the first differential unit being coupled to the input portion from the prime mover, a carrier of the second differential unit being coupled to the output portion toward the drive system, and a sun gear of the third differential unit being coupled to the output side motor/generator.

15. A hybrid transmission as claimed in claim 4, wherein the first, second, and third differential units are disposed in a predetermined order from a position nearest to the prime mover of the third differential unit, the first differential unit, and the second differential unit, the second and third differential units being constituted by simple planetary gear sets, the first differential unit being constituted by a double pinion planetary gear set, a ring gear of the first differential unit being coupled to a ring gear of the second differential unit, a sun gear of the second differential unit and a carrier of the first differential unit being coupled to a ring gear and a sun gear of the third differential unit, respectively, a brake being disposed to enable a fixation of a carrier of the third differential unit, a clutch being disposed to enable a coupling between arbitrary two revolvable elements of the third differential unit, an operation of the brake causing the selection of the second predetermined gear ratio, an operation of the clutch causing the selection of the second predetermined gear ratio, a sun gear of the first differential unit being coupled to the input side motor/generator, a ring gear of the first differential unit being coupled to the input portion from the prime mover, a carrier of the second differential unit being coupled to the output portion toward the drive system, and a sun gear of the third differential unit being coupled to the output side motor/generator.

16. A hybrid transmission as claimed in claim 4, wherein the first, second, and third differential units are disposed in a predetermined order from a position nearest to the prime mover of the third differential unit, the first differential unit, and the second differential unit, the first and second differential units being constituted by simple planetary gear sets, the third differential unit being constituted by a double pinion planetary gear set, a carrier of the first differential unit being coupled to a ring gear of the second differential unit, a sun gear of the second differential unit and a sun gear of the first differential unit being coupled to a sun gear and a carrier of the third differential unit, respectively, a brake being disposed to enable a fixation of a ring gear of the third differential unit, a clutch being disposed to enable a coupling between any arbitrary two revolvable elements of the third differential unit, an operation of the brake causing the selection of the second predetermined gear ratio, an operation of the clutch causing the selection of the first predetermined gear ratio, a ring gear of the first differential unit being coupled to the input side motor/generator, a carrier of the first differential gear unit being coupled to the input portion from the prime mover, a carrier of the second differential unit being coupled to the output portion toward the drive system, and a carrier of the third differential unit being coupled to the output side motor/generator.

17. A hybrid transmission as claimed in claim 4, wherein the first, second, and third differential units are disposed in a predetermined order from a position nearest to the prime mover of the third differential unit, the first differential unit, and the second differential unit, the first and second differential units being constituted by simple planetary gear sets, the third differential unit being constituted by a double pinion planetary gear set, a carrier of the first differential unit being coupled to a carrier of the second differential unit, a sun gear of the second differential unit and a ring gear of the first differential unit being coupled to a carrier and a sun gear of the third differential unit, respectively, a brake being disposed to enable a fixation of a ring gear of the third differential unit, a clutch being disposed to enable a coupling between any arbitrary two revolvable elements of the third differential unit, an operation of the brake causing the selection of the second predetermined gear ratio, an operation of the clutch causing the selection of the first predetermined gear ratio, a sun gear of the first differential unit being coupled to the input side motor/generator, a ring gear of the second differential unit being coupled to the input portion from the prime mover, a carrier of the second differential unit being coupled to the input portion toward the drive system, and a carrier of the third differential unit being coupled to the output side motor/generator.

18. A hybrid transmission as claimed in claim 4, wherein the first, second, and third planetary gear units are disposed in a predetermined order from a position nearest to the prime mover of the third differential unit, the first differential unit, and the second differential unit, the first and second differential units are constituted by simple planetary gear sets, the third differential unit being constituted by a double pinion planetary gear set, a carrier of the first differential unit being coupled to a carrier of the second differential unit, a ring gear of the second differential unit and a ring gear of the first differential unit being coupled to a carrier and a sun gear of the third differential unit, respectively, a brake being disposed to enable a fixation of a ring gear of the third differential unit, a clutch being disposed to enable a coupling between any arbitrary two revolvable elements of the third differential unit, an operation of the brake causing the selection of the second predetermined gear ratio, an operation of the clutch causing the selection of the first predetermined gear ratio, a sun gear of the first differential unit being coupled to the input side motor/generator, a sun gear of the second differential unit being coupled to the input portion from the prime mover, a carrier of the second differential unit being coupled to the output portion toward the drive system, and a carrier of the third differential unit being coupled to the output side motor/generator.

19. A hybrid transmission as claimed in claim 4, wherein the first, second, and third differential units are disposed in a predetermined order from a position nearest to the prime mover of the third differential unit, the first differential unit, and the second differential unit, the first and second differential units being constituted by simple differential gear sets, the third differential unit being constituted by a double pinion planetary gear set, a carrier of the first differential unit being mutually coupled to a carrier of the second differential unit, a sun gear of the second differential gear unit and a sun gear of the first differential unit being coupled to a carrier and a sun gear of the third differential unit, respectively, a brake being disposed to enable a fixation of a ring gear of the third differential unit, a clutch being disposed to enable a coupling between any arbitrary two revolvable elements of the third differential unit, an operation of the brake causing the selection of the second predetermined gear ratio, and an operation of the clutch causing the selection of the first predetermined gear ratio, a ring gear of the first differential unit being coupled to the input side motor/generator, a ring gear of the second differential unit being coupled to the input portion from the prime mover, a carrier of the second differential unit being coupled to the output portion toward the drive system, and a carrier of the third differential unit being coupled to the output side motor/generator.

20. A hybrid transmission as claimed in claim 1, wherein the two sets of the differential units are a first differential unit and a second differential unit, one of the revolvable elements of the first differential unit whose revolution speed order therein is a middle being coupled to one of the revolvable elements of the second differential unit whose revolution speed order is one of a one end and a middle, and a third differential unit having the two degrees of freedom and the three revolvable elements is disposed to make a gear shift in such a manner that one of the revolvable elements of the second differential unit whose revolution speed order therein is the other end and one of the revolvable elements of the first differential unit whose revolution speed order is an output side end are revolved mutually in one of the same direction and the reverse directions, an operation of a low brake disposed to enable a fixation of one of the revolvable elements of the third differential unit causing the selection of the second predetermined gear ratio, an operation of a high-clutch disposed to enable a coupling between any arbitrary two revolvable elements of the third differential unit causing the selection of the first predetermined gear ratio, an overdrive brake being disposed to fix one of the revolvable elements of the first differential unit whose revolution speed order therein is an input side end, an operation of the overdrive brake being carried out in addition to that of the low brake when a start requiring a driving force larger than a predetermined driving force occurs.

21. A hybrid transmission as claimed in claim 20, wherein the prime mover is an engine, the drive system is a vehicular drive system to driven road wheels, and the start is a vehicular start.

22. A hybrid transmission as claimed in claim 1, wherein the output side motor/generator is directly coupled to at least a sun gear of the two sets of the differential units which is not directly coupled to the output portion.

23. A hybrid transmission as claimed in claim 1, wherein the output side motor/generator is directly coupled to at least a carrier of the two sets of the differential units which is not directly coupled to the output portion.

24. A method applicable to a hybrid transmission, comprising:
providing a gear train that comprises two sets of differential units, each differential unit having two degrees of freedom and three revolvable elements, with one revolvable element of one of the two sets of the differential units coupled to one revolvable element of the other of the two sets of the differential units, wherein the hybrid transmission enables a selection between a first predetermined gear ratio wherein a remaining revolvable element of the one of the two sets of the differential units is revolved with a remaining one revolvable element of the other of the two sets of the differential units mutually in the same direction, and a second predetermined gear ratio wherein the remaining one revolvable element of the one of the two sets of the differential units is revolved with the remaining one revolvable element of the other of the two sets of the differential units mutually in reverse directions;
providing an input side motor/generator;
providing an output side motor/generator;
providing an input portion from a prime mover;
providing an output portion toward a drive system; and
coupling the input and output side motor/generators and input and output portions to the two sets of the differential units in such a manner that, under the selection of the first predetermined gear ratio, in a revolution speed order, the input side motor/generator, the input portion from the prime mover, the output portion toward the drive system, and the output side motor/generator are coupled to the respective revolvable elements of the two sets of the differential units and the output side motor/generator is coupled to at least one revolvable element which does not take part in a revolution of the output portion in any predetermined gear ratio.

* * * * *